(12) United States Patent
Hara et al.

(10) Patent No.: US 12,562,657 B2
(45) Date of Patent: Feb. 24, 2026

(54) INVERTER CONTROL DEVICE, HYBRID SYSTEM, ELECTROMECHANICAL INTEGRATED UNIT, ELECTRIC VEHICLE SYSTEM, AND INVERTER CONTROL METHOD

(71) Applicant: Hitachi Astemo, Ltd., Hitachinaka (JP)

(72) Inventors: Takafumi Hara, Tokyo (JP); Takaya Tsukagoshi, Hitachinaka (JP); Katsuhiro Hoshino, Hitachinaka (JP); Shigehisa Aoyagi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 203 days.

(21) Appl. No.: 18/686,225

(22) PCT Filed: Mar. 4, 2022

(86) PCT No.: PCT/JP2022/009570
§ 371 (c)(1),
(2) Date: Feb. 23, 2024

(87) PCT Pub. No.: WO2023/053490
PCT Pub. Date: Apr. 6, 2023

(65) Prior Publication Data
US 2024/0380337 A1 Nov. 14, 2024

(30) Foreign Application Priority Data

Sep. 30, 2021 (JP) .................................. 2021-162414

(51) Int. Cl.
| | |
|---|---|
| *H02M 7/5395* | (2006.01) |
| *H02M 1/15* | (2006.01) |
| *H02P 27/08* | (2006.01) |

(52) U.S. Cl.
CPC ........... *H02M 7/5395* (2013.01); *H02M 1/15* (2013.01); *H02P 27/08* (2013.01); *H02P 27/085* (2013.01)

(58) Field of Classification Search
CPC .. H02M 7/5395; H02M 1/15; H02M 7/53871; H02P 27/085; H02P 27/08;
(Continued)

(56) References Cited

U.S. PATENT DOCUMENTS

| | | | |
|---|---|---|---|
| 2007/0176575 A1* | 8/2007 | Nawa ................ | H02M 7/53875 318/800 |
| 2007/0278986 A1* | 12/2007 | Okamura .................. | H02P 5/74 318/798 |

(Continued)

FOREIGN PATENT DOCUMENTS

| | | |
|---|---|---|
| JP | 2009-232546 A | 10/2009 |
| JP | 2010-284017 A | 12/2010 |

(Continued)

OTHER PUBLICATIONS

International Search Report (PCT/ISA/210) issued in PCT Application No. PCT/JP2022/009570 dated May 24, 2022 with English translation (4 pages).

(Continued)

*Primary Examiner* — Yusef A Ahmed
(74) *Attorney, Agent, or Firm* — Crowell & Moring LLP

(57) ABSTRACT

An inverter control device includes: a carrier wave generation unit that generates a carrier wave; a carrier frequency adjustment unit that adjusts a frequency of the carrier wave; and a PWM control unit that performs pulse width modulation on a voltage command using the carrier wave and generates a PWM pulse signal for controlling an operation of an inverter. The carrier frequency adjustment unit determines a phase shift amount for reducing a voltage amplitude (Continued)

of a specific order component among order components of a voltage ripple superimposed on a DC voltage, and adjusts a frequency of the carrier wave so as to change a phase difference between the voltage command and the carrier wave according to the determined phase shift amount.

15 Claims, 15 Drawing Sheets

(58) Field of Classification Search
CPC .......... H02P 23/14; H02P 21/00; B60L 53/20; B60L 2210/40; B60L 2240/526; B60L 2240/527; B60L 2240/529; B60L 15/007; B60L 15/06; Y02T 10/72
See application file for complete search history.

(56) References Cited

U.S. PATENT DOCUMENTS

| | | | | |
|---|---|---|---|---|
| 2008/0106919 | A1* | 5/2008 | Shin | H02M 7/48 |
| | | | | 363/131 |
| 2011/0279071 | A1* | 11/2011 | Yamada | H02P 21/0089 |
| | | | | 318/400.02 |
| 2013/0057193 | A1* | 3/2013 | Iwaji | H02P 6/188 |
| | | | | 318/721 |
| 2014/0077738 | A1* | 3/2014 | Iwaji | H02P 21/04 |
| | | | | 318/400.36 |
| 2017/0294863 | A1* | 10/2017 | Takahashi | H02P 21/20 |
| 2018/0097464 | A1 | 4/2018 | Yamakawa et al. | |
| 2018/0251036 | A1 | 9/2018 | Tapadia et al. | |
| 2019/0319550 | A1* | 10/2019 | Watanabe | H02M 1/143 |
| 2020/0220488 | A1* | 7/2020 | Mori | H02M 7/5387 |
| 2020/0266749 | A1* | 8/2020 | Kajino | H02P 27/085 |
| 2020/0280278 | A1* | 9/2020 | Tamura | H02P 29/028 |
| 2022/0247328 | A1* | 8/2022 | Ajima | H02M 7/5395 |
| 2022/0294377 | A1* | 9/2022 | Takahashi | H02P 6/34 |
| 2022/0376641 | A1* | 11/2022 | Mori | H02P 29/028 |
| 2023/0008549 | A1* | 1/2023 | Tsukagoshi | H02P 27/08 |
| 2023/0035063 | A1* | 2/2023 | Hara | H02M 7/5387 |
| 2023/0141601 | A1* | 5/2023 | Hara | B60L 15/007 |
| 2023/0223824 | A1* | 7/2023 | Hara | H02M 1/327 |
| | | | | 310/68 R |
| 2023/0402953 | A1* | 12/2023 | Tsukagoshi | H02P 27/08 |
| 2024/0042867 | A1* | 2/2024 | Hara | B60L 15/08 |
| 2024/0227771 | A1* | 7/2024 | Tsukagoshi | H02P 29/50 |
| 2024/0262413 | A1* | 8/2024 | Hoshino | B62D 5/0472 |
| 2024/0291417 | A1* | 8/2024 | Aoyagi | H02M 1/0025 |
| 2025/0141340 | A1* | 5/2025 | Matsuo | H02M 1/12 |
| 2025/0192713 | A1* | 6/2025 | Tsukagoshi | H02P 23/04 |
| 2025/0226783 | A1* | 7/2025 | Tsukagoshi | B62D 5/0472 |

FOREIGN PATENT DOCUMENTS

| | | | |
|---|---|---|---|
| JP | 2018-61311 | A | 4/2018 |
| JP | 2019-187149 | A | 10/2019 |
| JP | 2020-509730 | A | 3/2020 |
| JP | 2021-136738 | A | 9/2021 |

OTHER PUBLICATIONS

Japanese-language Written Opinion (PCT/ISA/237) issued in PCT Application No. PCT/JP2022/009570 dated May 24, 2022 with English translation (6 pages).

* cited by examiner

*FIG. 9*

| MODULATION FACTOR / POWER FACTOR | 0 | 0.1 | 0.2 | 0.3 | 0.4 | 0.5 | 0.6 | 0.7 | 0.8 | 0.9 | 1 | 1.1 | 1.15 |
|---|---|---|---|---|---|---|---|---|---|---|---|---|---|
| 1.00 | 90 | 0 | 300 | 240 | 210 | 240 | 210 | 210 | 210 | 180 | 180 | 180 | 180 |
| 0.98 | 330 | 330 | 240 | 240 | 60 | 60 | 60 | 60 | 60 | 90 | 150 | 0 | 0 |
| 0.94 | 150 | 240 | 240 | 60 | 60 | 90 | 120 | 120 | 150 | 150 | 180 | 60 | 210 |
| 0.87 | 150 | 270 | 210 | 240 | 180 | 150 | 150 | 150 | 150 | 180 | 210 | 210 | 210 |
| 0.77 | 120 | 270 | 210 | 210 | 180 | 180 | 180 | 180 | 150 | 150 | 210 | 210 | 240 |

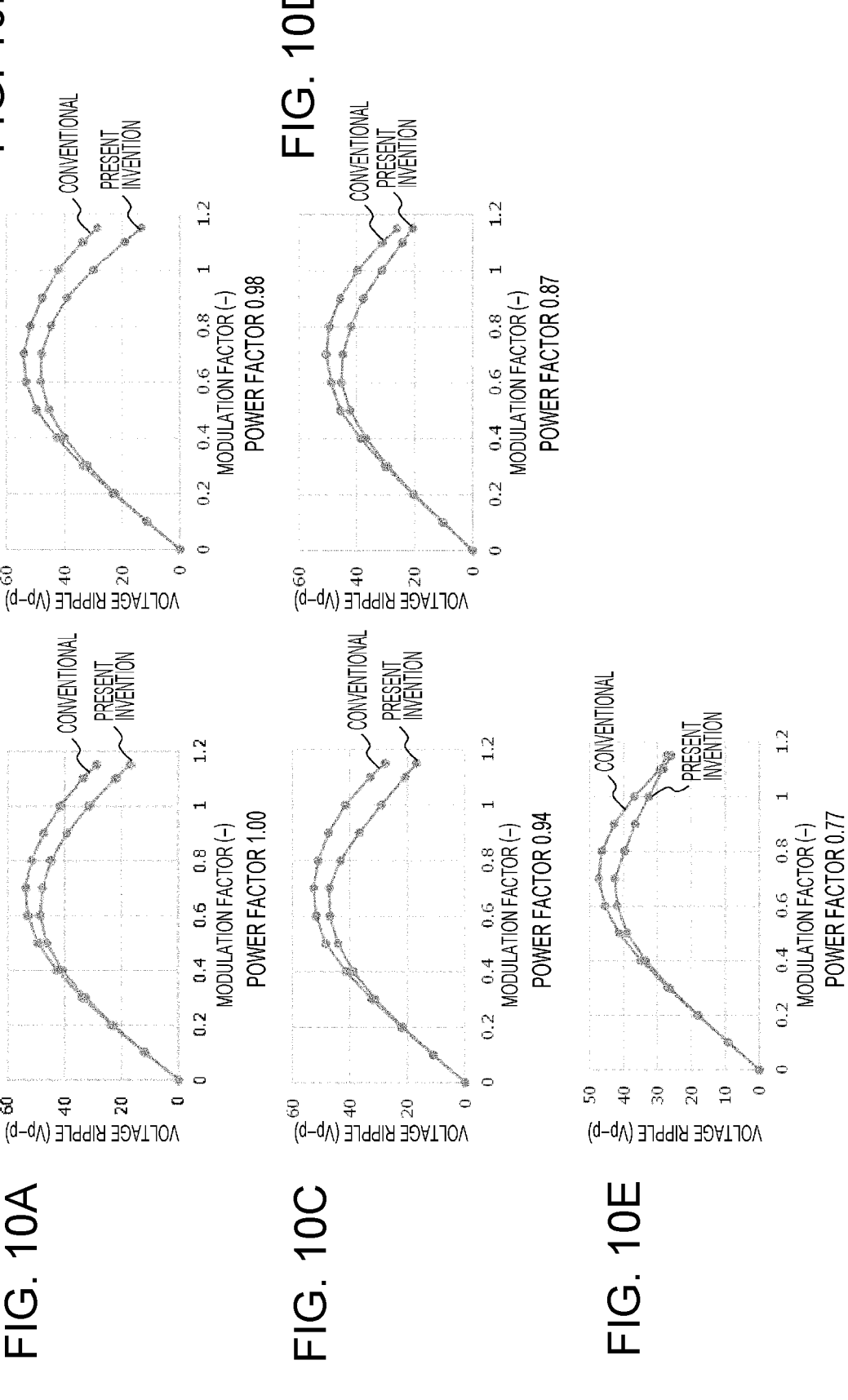

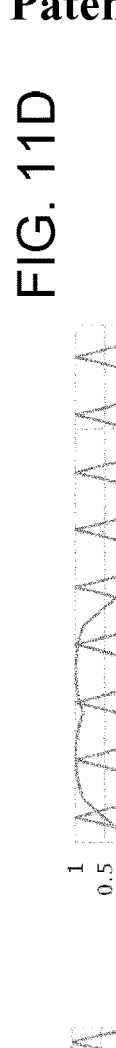

FIG. 11D

CARRIER WAVE — U-PHASE VOLTAGE COMMAND

VOLTAGE COMMAND AND CARRIER WAVE (AFTER PHASE SHIFT)

FIG. 11E

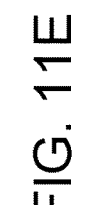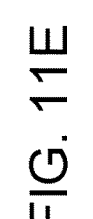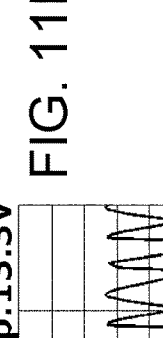

VOLTAGE p-p:13.3V

CAPACITOR VOLTAGE RIPPLE WAVEFORM (AFTER PHASE SHIFT)

TIME (ms)

VOLTAGE (V)

FIG. 11F

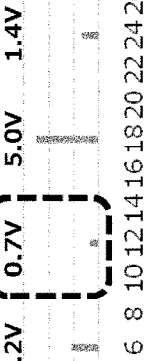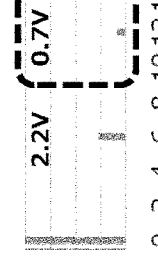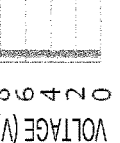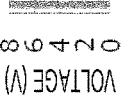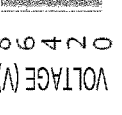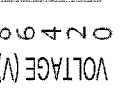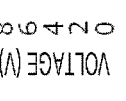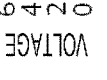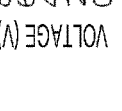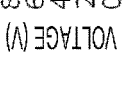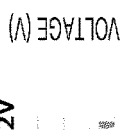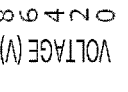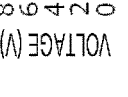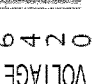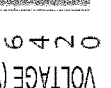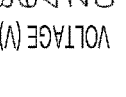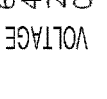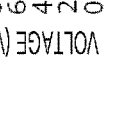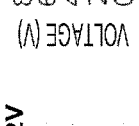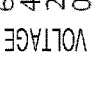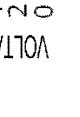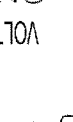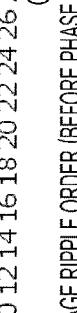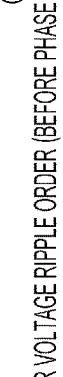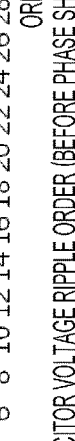

2.2V   0.7V   5.0V   1.4V   0.8V

ORDER (−)

CAPACITOR VOLTAGE RIPPLE ORDER (AFTER PHASE SHIFT)

VOLTAGE (V)

FIG. 11A

CARRIER WAVE — U-PHASE VOLTAGE COMMAND

VOLTAGE COMMAND AND CARRIER WAVE (BEFORE PHASE SHIFT)

FIG. 11B

VOLTAGE p-p:28.5V

CAPACITOR VOLTAGE RIPPLE WAVEFORM (BEFORE PHASE SHIFT)

TIME (ms)

VOLTAGE (V)

FIG. 11C

1.9V   7.4V   4.2V   1.9V   1.2V

ORDER (−)

CAPACITOR VOLTAGE RIPPLE ORDER (BEFORE PHASE SHIFT)

VOLTAGE (V)

INVERTER CONTROL DEVICE, HYBRID SYSTEM, ELECTROMECHANICAL INTEGRATED UNIT, ELECTRIC VEHICLE SYSTEM, AND INVERTER CONTROL METHOD

TECHNICAL FIELD

The present invention relates to an inverter control device, a hybrid system, an electromechanical integrated unit, an electric vehicle system, and an inverter control method.

BACKGROUND ART

An inverter that is connected to a driving motor used in an electric vehicle or a hybrid vehicle, converts a DC voltage supplied from a battery into an AC voltage, and outputs the AC voltage to the driving motor is widely used. Such an inverter is required to be small and lightweight from the viewpoint of improvement in power cost and restriction of mounting space. The inverter includes a power module, a smoothing capacitor, a current sensor, a bus bar wiring, a gate drive substrate, a control substrate, and the like. The power module generates an AC voltage by changing a DC voltage in a pulse shape by a switching operation. The smoothing capacitor is provided between the battery, which is a DC voltage source, and the power module in order to smooth the fluctuation (hereinafter referred to as "capacitor voltage ripple") of the DC voltage caused by the switching operation of the power module.

The capacitor voltage ripple changes depending on a capacitance of the smoothing capacitor and a switching frequency of the power module. Therefore, capacitor voltage ripples can be reduced by increasing the capacitance of the smoothing capacitor or increasing the switching frequency. However, an increase in capacitance of the smoothing capacitor leads to an increase in volume of the smoothing capacitor, and an increase in switching frequency leads to an increase in switching loss. Therefore, in the inverter, it is required to reduce the capacitor voltage ripple by a method other than these methods.

The technique of PTL 1 is known for reducing capacitor voltage ripples. PTL 1 discloses an inverter control device including a fundamental wave generation unit 112 that generates a fundamental wave command for generating AC power of one phase of three-phase AC power, an adjustment wave generation unit 113 that generates an adjustment wave command having a frequency three times the fundamental wave command, a command output unit 114 that outputs a phase voltage command obtained by superimposing the adjustment wave command on the fundamental wave command, and a phase calculation unit 122 that calculates a phase of the adjustment wave command based on a power factor of the three-phase AC power to reduce voltage ripples generated at DC buses 14P and 14N at frequencies twice the frequency of the fundamental wave command.

CITATION LIST

Patent Literature

PTL 1: JP 2019-187149 A

SUMMARY OF INVENTION

Technical Problem

In general, the input side circuit of the inverter has a resonance frequency determined according to the inductance of the bus bar wiring connecting the battery and the smoothing capacitor. In the technique of PTL 1, when a frequency of a specific order component among order components (harmonic components) of the capacitor voltage ripple matches the resonance frequency, the order component is amplified, and thus there is a problem that the capacitor voltage ripple cannot be sufficiently suppressed.

Solution to Problem

An inverter control device according to the present invention controls an inverter that converts a DC voltage into an AC voltage and outputs the AC voltage to a motor, and the inverter control device includes: a carrier wave generation unit that generates a carrier wave; a carrier frequency adjustment unit that adjusts a frequency of the carrier wave; and a PWM control unit that performs pulse width modulation on a voltage command using the carrier wave and generates a PWM pulse signal for controlling an operation of the inverter, wherein the carrier frequency adjustment unit determines a phase shift amount for reducing a voltage amplitude of a specific order component among order components of a voltage ripple superimposed on the DC voltage, and adjusts a frequency of the carrier wave to change a phase difference between the voltage command and the carrier wave according to the determined phase shift amount.

A hybrid system according to the present invention includes an inverter control device; an inverter connected to the inverter control device; a motor driven by the inverter; and an engine system connected to the motor.

An electromechanical integrated unit according to the present invention includes: an inverter control device; an inverter connected to the inverter control device; a motor driven by the inverter; and a gear that transmits a rotational driving force of the motor, wherein the motor, the inverter, and the gear are integrated.

An electric vehicle system according to the present invention includes: an inverter control device; an inverter connected to the inverter control device; and a motor driven by the inverter, wherein the electric vehicle system travels using a rotational driving force of the motor.

An inverter control method according to the present invention is an inverter control method for controlling an inverter that converts a DC voltage into an AC voltage and outputs the AC voltage to a motor, the method including: generating a carrier wave; determining a phase shift amount for reducing a voltage amplitude of a specific order component among order components of a voltage ripple superimposed on the DC voltage; adjusting a frequency of the carrier wave to change a phase difference between a voltage command and the carrier wave according to the determined phase shift amount; and generating a PWM pulse signal for controlling an operation of the inverter by performing pulse width modulation on the voltage command using the carrier wave.

Advantageous Effects of Invention

According to the present invention, the capacitor voltage ripple can be sufficiently suppressed.

BRIEF DESCRIPTION OF DRAWINGS

FIG. 9 is a diagram illustrating an example of a map of a 12th-order component.

FIGS. 10A to 10E are diagrams illustrating a comparative example of capacitor voltage ripples according to the conventional technique and the present invention.

FIGS. 11A to 11F are diagrams illustrating a comparative example of the capacitor voltage ripple before and after shifting the phase of the carrier wave.

DESCRIPTION OF EMBODIMENTS

First Embodiment

Hereinafter, a first embodiment of the present invention will be described with reference to the drawings.

Figure 1:
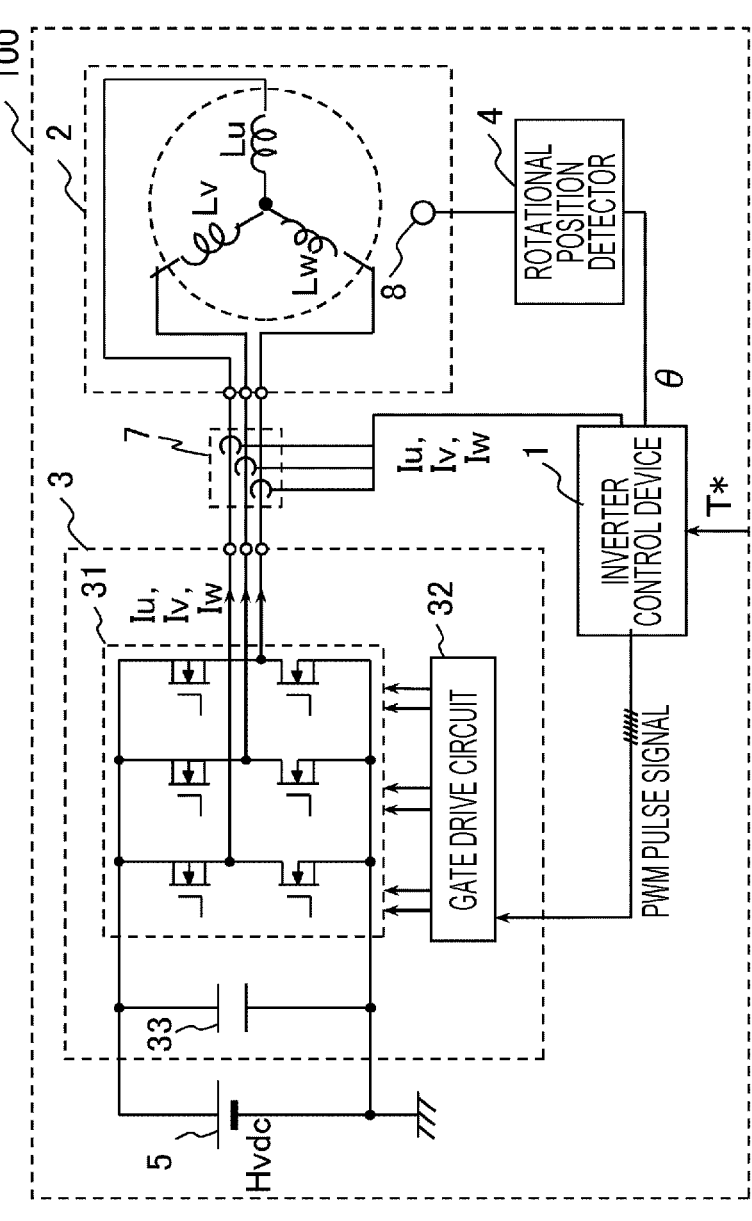
FIG. 1 is an overall configuration diagram of a motor drive system including an inverter control device according to an embodiment of the present invention.

FIG. 1 is an overall configuration diagram of a motor drive system including an inverter control device according to an embodiment of the present invention. In FIG. 1, a motor drive system 100 includes an inverter control device 1, a permanent magnet synchronous motor (hereinafter, simply referred to as a "motor") 2, an inverter 3, a rotational position detector 4, and a high-voltage battery 5.

The inverter control device 1 controls the operation of the inverter 3 on the basis of a torque command T* according to a target torque required from the vehicle to the motor 2, thereby generating a PWM pulse signal for controlling the drive of the motor 2. Then, the generated PWM pulse signal is output to the inverter 3. Details of the inverter control device 1 will be described below.

The inverter 3 includes an inverter circuit 31, a gate drive circuit 32, and a smoothing capacitor 33. The gate drive circuit 32 generates a gate drive signal for controlling each switching element included in the inverter circuit 31 on the basis of the PWM pulse signal input from the inverter control device 1, and outputs the gate drive signal to the inverter circuit 31. The inverter circuit 31 includes switching elements corresponding to each of an upper arm and a lower arm of U-phase, V-phase, and W-phase. By controlling each of these switching elements in accordance with a gate drive signal input from the gate drive circuit 32, DC power supplied from the high-voltage battery 5 is converted into AC power and output to the motor 2. The smoothing capacitor 33 smooths the DC power supplied from the high-voltage battery 5 to the inverter circuit 31.

The motor 2 is a synchronous motor rotationally driven by AC power supplied from the inverter 3, and includes a stator and a rotor. When the AC power input from the inverter 3 is applied to armature coils Lu, Lv, and Lw provided in the stator, three-phase AC currents Iu, Iv, and Iw are conducted in the motor 2, and an armature magnetic flux is generated in each armature coil. When attractive force and repulsive force are generated between the armature magnetic flux of each armature coil and the magnet magnetic flux of the permanent magnet disposed in the rotor, torque is generated in the rotor, and the rotor is rotationally driven.

A rotational position sensor 8 for detecting a rotational position θ of the rotor is attached to the motor 2. The rotational position detector 4 calculates a rotational position θ from an input signal of the rotational position sensor 8. The calculation result of the rotational position θ by the rotational position detector 4 is input to the inverter control device 1, and is used in the phase control of the AC power performed by the inverter control device 1 generating the PWM pulse signal in accordance with the phase of the induced voltage of the motor 2.

Here, a resolver including an iron core and a winding wire is more suitable as the rotational position sensor 8, but there is also no problem with a sensor using a magnetoresistive element such as a GMR sensor or a Hall element. Further, the rotational position detector 4 may estimate the rotational position θ by using the three-phase AC currents Iu, Iv, and Iw flowing through the motor 2 and three-phase AC voltages Vu, Vv, and Vw applied from the inverter 3 to the motor 2 without using the input signal from the rotational position sensor 8.

Figure 2:
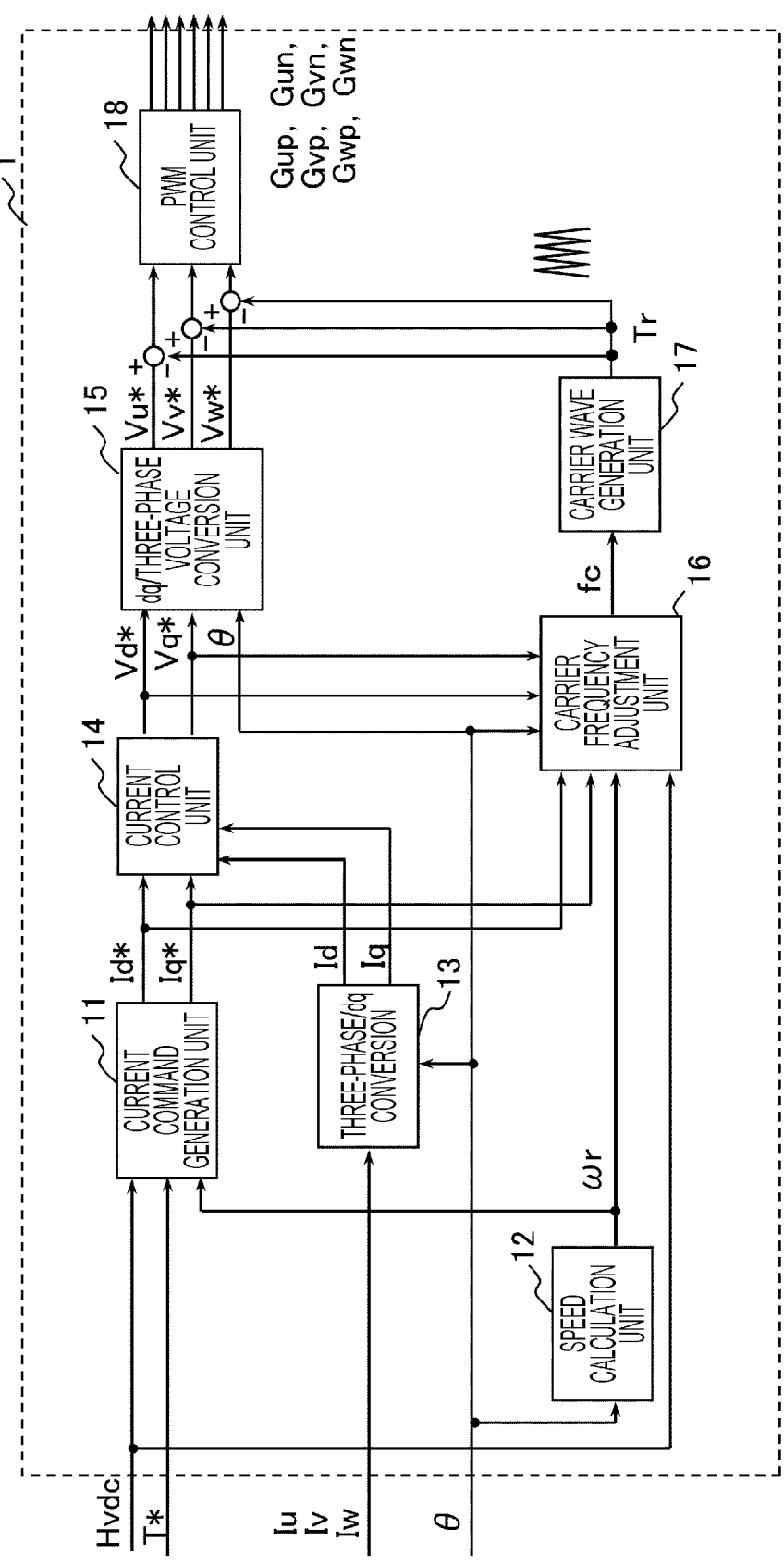
FIG. 2 is a block diagram illustrating a functional configuration of the inverter control device according to a first embodiment of the present invention.

A current detection unit 7 is disposed between the inverter 3 and the motor 2. The current detection unit 7 detects three-phase AC currents Iu, Iv, and Iw (U-phase AC current Iu, V-phase AC current Iv, and W-phase AC current Iw) that energize the motor 2. The current detection unit 7 is configured using, for example, a Hall current sensor or the like. Detection results of the three-phase AC currents Iu, Iv, and Iw by the current detection unit 7 are input to the inverter control device 1, and are used for generation of a PWM pulse signal performed by the inverter control device 1. Although FIG. 2 illustrates an example in which the current detection unit 7 includes three current detectors, two current detectors may be provided, and the AC current of the remaining one phase may be calculated from the fact that the sum of the three-phase AC currents Iu, Iv, and Iw is zero. The pulsed DC current flowing from the high-voltage battery 5 into the inverter 3 may be detected by a shunt resistor or the like inserted between the smoothing capacitor 33 and the inverter 3, and the three-phase AC currents Iu, Iv, and Iw may be obtained based on the DC current and the three-phase AC voltages Vu, Vv, and Vw applied from the inverter 3 to the motor 2.

Next, details of the inverter control device 1 will be described. FIG. 2 is a block diagram illustrating a functional configuration of the inverter control device 1 according to the first embodiment of the present invention. In FIG. 2, the inverter control device 1 includes functional blocks of a current command generation unit 11, a speed calculation unit 12, a three-phase/dq conversion current control unit 13, a current control unit 14, a dq/three-phase voltage command conversion unit 15, a carrier frequency adjustment unit 16, a carrier wave generation unit 17, and a PWM control unit 18. The inverter control device 1 includes, for example, a microcomputer, and can implement these functional blocks by executing a predetermined program in the microcomputer. Alternatively, some or all of these functional blocks may be realized using a hardware circuit such as a logic IC or an FPGA.

The current command generation unit 11 calculates a d-axis current command Id* and a q-axis current command Iq* based on an input torque T* command and a power supply voltage Hvdc. Here, for example, the d-axis current command Id* and the q-axis current command Iq* according to the torque command T* are obtained using a preset current command map, a formula, or the like.

The speed calculation unit 12 calculates a motor rotation speed ωr representing the rotation speed of the motor 2 from the temporal change of the rotational position θ. The motor rotation speed ωr may be a value represented by either an angular speed (rad/s) or a rotation speed (rpm). In addition, these values may be mutually converted and used.

The three-phase/dq conversion current control unit 13 performs dq conversion based on the rotational position θ obtained by the rotational position detector 4 on the three-phase AC currents Iu, Iv, and Iw detected by the current detection unit 7, and calculates a d-axis current value Id and a q-axis current value Iq.

Based on deviations between the d-axis current command Id* and the q-axis current command Iq* output from the current command generation unit 11 and the d-axis current value Id and the q-axis current value Iq output from the three-phase/dq conversion current control unit 13, the current control unit 14 calculates a d-axis voltage command Vd* and a q-axis voltage command Vq* according to the torque command T* so that these values coincide with each other. Here, for example, by a control method such as PI control, the d-axis voltage command Vd* according to a deviation between the d-axis current command Id* and the d-axis current value Id and the q-axis voltage command Vq* according to a deviation between the q-axis current command Iq* and the q-axis current value Iq are obtained.

The dq/three-phase voltage command conversion unit 15 performs three-phase conversion based on the rotational position θ obtained by the rotational position detector 41 on the d-axis voltage command Vd* and the q-axis voltage command Vq* calculated by the current control unit 14, and calculates three-phase voltage commands Vu*, Vv*, and Vw* (U-phase voltage command value Vu*, V-phase voltage command value Vv*, and W-phase voltage command value Vw*). As a result, the three-phase voltage commands Vu*, Vv*, and Vw* according to the torque command T* are generated.

The carrier frequency adjustment unit 16 calculates a carrier frequency fc representing the frequency of the carrier wave used to generate the PWM pulse signal based on the d-axis current command Id* and the q-axis current command Iq* generated by the current command generation unit 11, the d-axis voltage command Vd* and the q-axis voltage command Vq* obtained by the current control unit 14, the rotational position θ obtained by the rotational position detector 4, the rotation speed ωr obtained by the speed calculation unit 12, and the power supply voltage Hvdc. When the carrier wave generation unit 17 generates a carrier wave according to the carrier frequency fc, the frequency of the carrier wave is adjusted so that the capacitor voltage ripple generated between both ends of the smoothing capacitor 33 can be reduced. Note that details of a method of calculating the carrier frequency fc by the carrier frequency adjustment unit 16 will be described below.

The carrier wave generation unit 17 generates a carrier wave signal (triangular wave signal) Tr based on the carrier frequency fc calculated by the carrier frequency adjustment unit 16.

Using the carrier wave signal Tr output from the carrier wave generation unit 17, the PWM control unit 18 performs pulse width modulation on each of the three-phase voltage commands Vu*, Vv*, and Vw* output from the dq/three-phase voltage command conversion unit 15, and generates a PWM pulse signal for controlling the operation of the inverter 3. Specifically, on the basis of a comparison result between the three-phase voltage commands Vu*, Vv*, and Vw* output from the dq/three-phase voltage command conversion unit 15 and the carrier wave signal Tr output from the carrier wave generation unit 17, a pulsed voltage is generated for each phase of the U-phase, the V-phase, and the W-phase. Then, a PWM pulse signal for the switching element of each phase of the inverter 3 is generated based on the generated pulsed voltage. At this time, PWM pulse signals Gup, Gyp, and Gwp of the upper arms of the respective phases are logically inverted to generate PWM pulse signals Gun, Gvn, and Gwn of the lower arms. The PWM pulse signal generated by the PWM control unit 18 is output from the inverter control device 1 to the gate drive circuit 32 of the inverter 3, and is converted into a gate drive signal by the gate drive circuit 32. As a result, each switching element of the inverter circuit 31 is controlled to be turned on/off, and the output voltage of the inverter 3 is adjusted.

Next, the operation of the carrier frequency adjustment unit 16 in the inverter control device 1 will be described. As described above, the carrier frequency adjustment unit 16 calculates the carrier frequency fc based on the d-axis current command Id* and the q-axis current command Iq*, the d-axis voltage command Vd* and the q-axis voltage command Vq*, the rotational position θ, the rotation speed ωr, and the power supply voltage Hvdc. By sequentially controlling the frequency of the carrier wave signal Tr generated by the carrier wave generation unit 17 according to the carrier frequency fc, the carrier frequency adjustment unit 16 adjusts the voltage waveforms of the three-phase voltage commands Vu*, Vv*, and Vw* according to the torque command T* so that the cycle and the phase of the carrier wave signal Tr have a desired relationship. Here, the desired relationship refers to, for example, a relationship in which the frequency of a specific order component of the capacitor voltage ripple caused by the switching operation of the inverter 3 does not match the resonance frequency of the input side circuit of the inverter 3.

Figure 3:
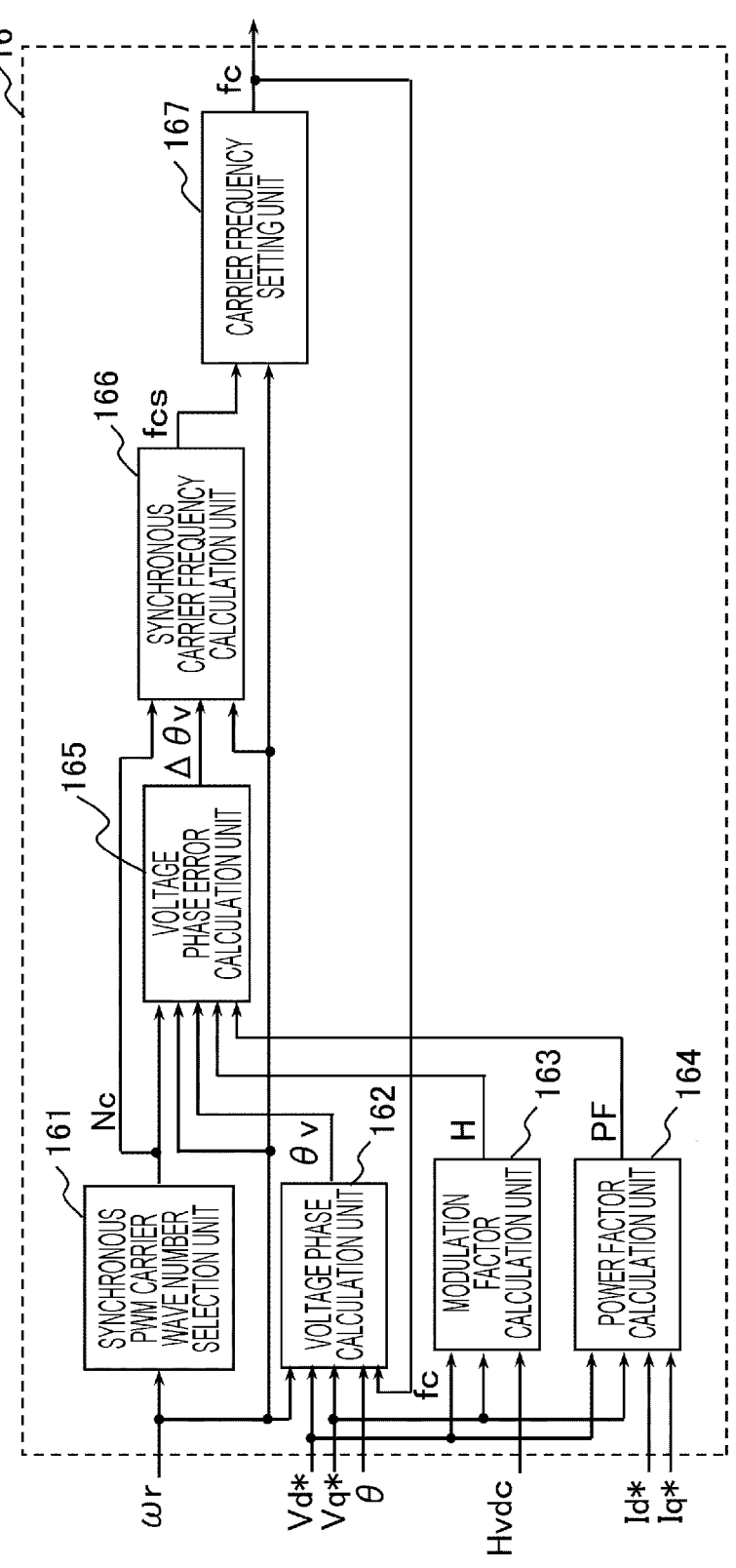
FIG. 3 is a block diagram of a carrier frequency adjustment unit according to the first embodiment of the present invention.

FIG. 3 is a block diagram of the carrier frequency adjustment unit 16 according to the first embodiment of the present invention. The carrier frequency adjustment unit 16 includes a synchronous PWM carrier wave number selection unit 161, a voltage phase calculation unit 162, a modulation factor calculation unit 163, a power factor calculation unit 164, a voltage phase error calculation unit 165, a synchronous carrier frequency calculation unit 166, and a carrier frequency setting unit 167.

The synchronous PWM carrier wave number selection unit 161 selects a synchronous PWM carrier wave number Nc representing the number of carrier waves for one cycle of the voltage waveform in synchronous PWM control based on the rotation speed ωr. For example, the synchronous PWM carrier wave number selection unit 161 selects the number satisfying the conditional expression of Nc=3×(2× n−1) among multiples of 3 as the synchronous PWM carrier wave number Nc. In this conditional expression, n represents an arbitrary natural number, and for example, n=1 (Nc=3), n=2 (Nc=9), n=3 (Nc=15), or the like is often selected. In addition, by using a special carrier wave, it is also possible to select, as the synchronous PWM carrier wave number Nc, a number that does not satisfy the above conditional expression even if the number is a multiple of 3, for example, Nc=6 or Nc=12. The synchronous PWM carrier wave number selection unit 161 may select the synchronous PWM carrier wave number Nc based on not only the rotation speed ωr but also the torque command T*. Further, selection criterion of the synchronous PWM carrier wave number Nc may be changed by setting hysteresis, for example, between when the rotation speed ωr increases and when the rotation speed ωr decreases.

The voltage phase calculation unit 162 calculates a voltage phase θv by following Formulas (1) to (4) on the basis of the d-axis voltage command Vd*, the q-axis voltage command Vq*, the rotational position θ, the rotation speed ωr, and the carrier frequency fc.

$$\theta v = \theta + \phi v + \phi dqv + 0.5\ \pi \qquad (1)$$

$$\phi v = \omega r \cdot 1.5\ Tc \qquad (2)$$

$$Tc = 1/fc \qquad (3)$$

$$\phi dqv = \mathrm{atan}\ (Vq/Vd) \qquad (4)$$

Here, φv represents a calculation delay compensation value of a voltage phase, Tc represents a carrier wave period, and φdqv represents a voltage phase from the d-axis. The calculation delay compensation value φv is a value that compensates for the occurrence of a calculation delay corresponding to 1.5 control cycles from when the rotational position detector 4 acquires the rotational position θ to when the inverter control device 1 outputs the PWM pulse signal to the inverter 3. In the present embodiment, 0.5 π is added in the fourth term on the right side of Formula (1). This is a calculation for performing viewpoint transformation of a cos wave into a sin wave because the voltage phase calculated in the first to third terms on the right side of Formula (1) is a cos wave.

The modulation factor calculation unit 163 calculates the modulation factor H based on the d-axis voltage command Vd*, the q-axis voltage command Vq*, and the power supply voltage Hvdc according to the following Formula (5). The modulation factor H represents the ratio between the DC voltage supplied from the high-voltage battery 5 to the inverter 3 and the AC voltage output from the inverter 3 to the motor 2.

$$H = \sqrt{(Vd\hat{\ }2 + Vq\hat{\ }2)}/Hvdc \qquad (5)$$

The power factor calculation unit 164 calculates the power factor PF based on the d-axis current command Id*, the q-axis current command Iq*, the d-axis voltage command Vd*, and the q-axis voltage command Vq* according to the following Formula (6). The power factor PF is a parameter representing a phase difference between a voltage vector and a current vector in the AC power output from the inverter 3 to the motor 2, and is an important parameter that determines how much current flows to the DC side in the motor 2. The tendency of the capacitor voltage ripple in the smoothing capacitor 33 greatly changes depending on the value of the power factor PF.

$$PF = \cos\ \left(\mathrm{atan}\ \left(-Id/Iq\right) - \mathrm{atan}\ \left(-Vd/Vq\right)\right) \qquad (6)$$

The voltage phase error calculation unit 165 calculates a voltage phase error Δθv based on the synchronous PWM carrier wave number Nc selected by the synchronous PWM carrier wave number selection unit 161, the voltage phase θv calculated by the voltage phase calculation unit 162, the modulation factor H calculated by the modulation factor calculation unit 163, the power factor PF calculated by the power factor calculation unit 164, and the rotation speed ωr. The voltage phase error Δθv represents a phase difference between the three-phase voltage commands Vu*, Vv*, and Vw*, which are voltage commands for the inverter 3, and the carrier wave signal Tr used for pulse width modulation. The voltage phase error calculation unit 165 calculates the voltage phase error Δθv every predetermined calculation period, so that the carrier frequency adjustment unit 16 can change the phase difference between the voltage command to the inverter 3 and the carrier wave used for pulse width modulation, thereby performing the frequency adjustment of the carrier wave signal Tr so as to suppress the capacitor voltage ripple.

The synchronous carrier frequency calculation unit 166 calculates a synchronous carrier frequency fcs based on the voltage phase error Δθv calculated by the voltage phase error calculation unit 165, the rotation speed ωr, and the synchronous PWM carrier wave number Nc selected by the synchronous PWM carrier wave number selection unit 161 according to the following Formula (7).

$$fcs = \omega r \cdot Nc \cdot (1 + \Delta\theta v \cdot K)/(2\pi) \qquad (7)$$

The synchronous carrier frequency calculation unit 166 can calculate the synchronous carrier frequency fcs based on Formula (7), for example, by phase locked loop (PLL) control. In Formula (7), the gain K may be a constant value or may be variable depending on conditions.

The carrier frequency setting unit 167 selects either the synchronous carrier frequency fcs calculated by the synchronous carrier frequency calculation unit 166 or an asynchronous carrier frequency fans on the basis of the rotation speed ωr, and outputs the selected frequency as the carrier frequency fc. The asynchronous carrier frequency fcns is a constant value preset in the carrier frequency setting unit 167. Note that a plurality of asynchronous carrier frequencies fcns may be prepared in advance, and one of the asynchronous carrier frequencies may be selected according to the rotation speed Or. For example, the carrier frequency setting unit 167 can select and output the asynchronous carrier frequency fcns as the carrier frequency fc such that the larger the value of the rotation speed ωr, the larger the value of the asynchronous carrier frequency fcns.

Next, a method of calculating the voltage phase error Δθv in the voltage phase error calculation unit 165 in the carrier frequency adjustment unit 16 will be described in detail.

Figure 4:
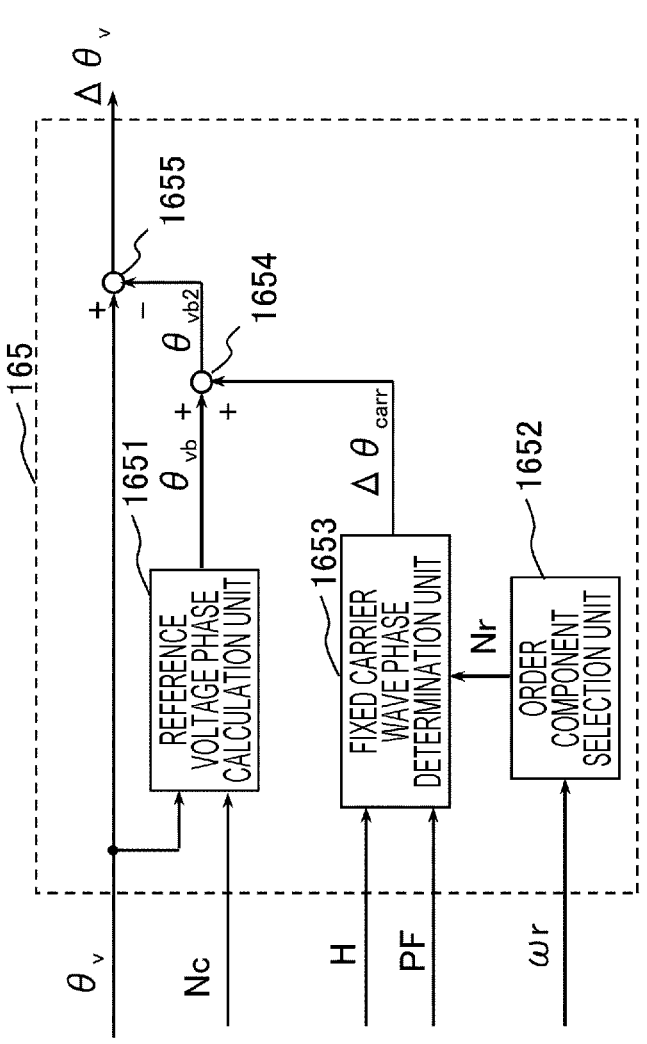
FIG. 4 is a block diagram of a voltage phase error calculation unit according to the first embodiment of the present invention.

FIG. 4 is a block diagram of the voltage phase error calculation unit 165 according to the first embodiment of the present invention. The voltage phase error calculation unit 165 includes a reference voltage phase calculation unit 1651, an order component selection unit 1652, a fixed carrier phase determination unit 1653, an addition unit 1654, and a subtraction unit 1655.

The reference voltage phase calculation unit 1651 calculates a reference voltage phase θvb for fixing the phase of the carrier wave in synchronous PWM control based on the synchronous PWM carrier wave number Nc and the voltage phase θv.

Figure 5:
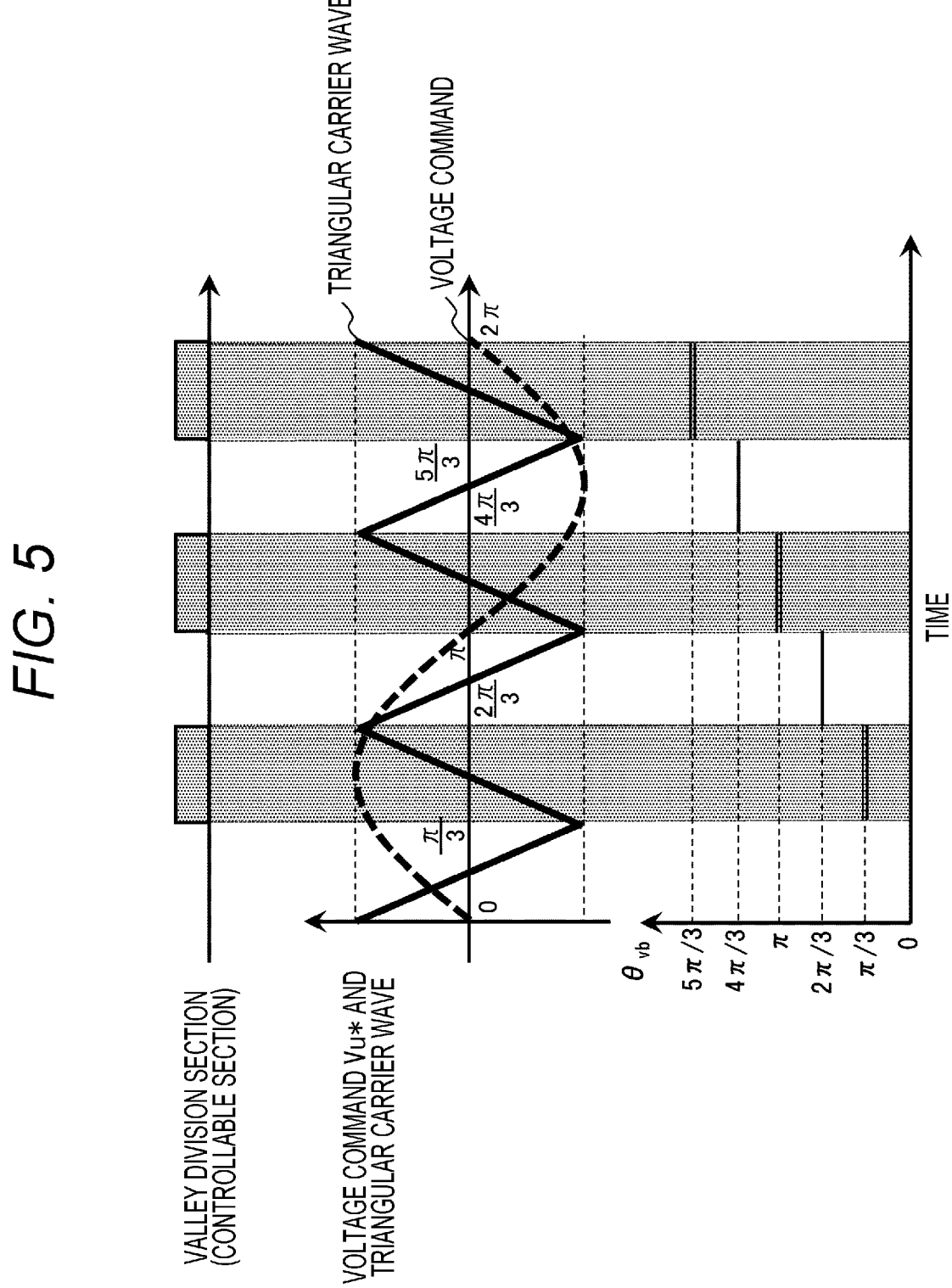
FIG. 5 is a conceptual diagram of reference voltage phase calculation of the present invention.

FIG. 5 is a conceptual diagram of the reference voltage phase calculation performed by the reference voltage phase calculation unit 1651. For example, as illustrated in FIG. 5, the reference voltage phase calculation unit 1651 calculates a reference voltage phase θvb that changes stepwise between 0 and 2π with the number of steps corresponding to the synchronous PWM carrier wave number Nc. Although FIG. 5 illustrates an example when the synchronous PWM carrier wave number Nc is 3 for easy understanding of the description, actually, the synchronous PWM carrier wave number Nc is preferably Nc=3, 9, or 15 as described above. Alternatively, Nc may be 6 or 12.

In the present embodiment, in order to reduce the processing load, for example, as illustrated in FIG. 5, the carrier frequency adjustment unit 16 can adjust the frequency of the carrier wave only in a peak front section that is a section in which the triangular carrier wave rises from a minimum value (valley) to a maximum value (peak). In this case, as described below, the synchronous carrier frequency calculation unit 166 performs the synchronous PWM control by sequentially calculating the synchronous carrier frequency fcs from the voltage phase error Δθv in the peak front section of the carrier wave. The reference voltage phase calculation unit 1651 calculates the reference voltage phase θvb used for the calculation of the voltage phase error Δθv as a discrete value that changes at π/3 intervals as illustrated in FIG. 5. The interval between the reference voltage phases θvb changes according to the synchronous PWM carrier wave number Nc. As the synchronous PWM carrier wave number Nc increases, the interval between the reference voltage phases θvb decreases.

Specifically, the reference voltage phase calculation unit 1651 calculates the reference voltage phase θvb based on the voltage phase θv and the synchronous PWM carrier wave number Nc according to the following Formulas (8) to (9).

$$\theta vb = \mathrm{int}\ (\theta v/\theta s)\cdot\theta s + 0.5\ \theta s \qquad (8)$$

$$\theta s = 2\pi/Nc \qquad (9)$$

Here, θs represents a change width of the voltage phase θv per carrier wave, and int represents a rounding down operation after the decimal point.

Note that, in the present embodiment, the reference voltage phase calculation unit 1651 calculates the reference voltage phase θvb according to Formulas (8) to (9) so that the reference voltage phase θvb becomes 0 rad in the peak tailing section, which is a section in which the triangular carrier wave falls from the maximum value (peak) to the minimum value (valley) However, the period during which the reference voltage phase θvb becomes 0 rad is not limited to the peak tailing section. If the reference voltage phase θvb changing stepwise with the number of steps corresponding to the synchronous PWM carrier wave numbers Nc between 0 and 2π can be calculated using the voltage phase θv, the reference voltage phase calculation unit 1651 may calculate the reference voltage phase θvb by a calculation method other than formulas (8) to (9).

Based on the rotation speed ωr, the order component selection unit 1652 selects an order component (hereinafter, referred to as "target order component") Nr whose voltage amplitude is to be reduced in the capacitor voltage ripple. In the inverter 3, a DC voltage supplied from the high-voltage battery 5 fluctuates due to a switching operation of each switching element of the inverter circuit 31. This DC voltage fluctuation is suppressed by the smoothing capacitor 33, but cannot be completely eliminated, and appears as a voltage fluctuation (capacitor voltage ripple) of the smoothing capacitor 33. Such capacitor voltage ripples include order components having the frequencies of the three-phase AC voltages Vu, Vv, and Vw as fundamental waves. In the present embodiment, the order component selection unit 1652 selects, as the target order component Nr, an order component whose frequency matches the resonance frequency of the input side circuit of the inverter 3 among the order components of the capacitor voltage ripples. Note that details of a method of selecting the target order component Nr in the order component selection unit 1652 will be described below.

Based on the target order component Nr selected by the order component selection unit 1652, the modulation factor H, and the power factor PF, the fixed carrier phase determination unit 1653 determines a carrier phase difference Δθcarr representing the phase difference of the carrier wave with respect to the reference voltage phase θvb in order to use the carrier phase difference Δθcarr for the calculation of the voltage phase error Δθv. Here, the modulation factor H and the power factor PF are used as parameters to determine the optimum value of the carrier phase difference Δθcarr for reducing the voltage amplitude of the target order component Nr, so that the phase of the carrier wave based on the reference voltage phase θvb is fixed to the carrier phase difference Δθcarr. Note that details of a method of determining the carrier phase difference Δθcarr in the fixed carrier phase determination unit 1653 will be described below.

The addition unit 1654 adds the carrier phase difference Δθcarr determined by the fixed carrier phase determination unit 1653 to the reference voltage phase θvb calculated by the reference voltage phase calculation unit 1651 to calculate a corrected reference voltage phase θvb2 for reducing the voltage amplitude of the target order component Nr of the capacitor voltage ripple.

The subtraction unit 1655 subtracts the corrected reference voltage phase θvb2 from the voltage phase θv to calculate the voltage phase error Δθv.

Next, details of the order component selection unit 1652 and the fixed carrier phase determination unit 1653, which are features of the present invention, will be described below.

First, the capacitor voltage ripple addressed in the present invention will be described. In the motor drive system 100 of the present embodiment, the inverter 3 converts a DC voltage output from the high-voltage battery 5 into a three-phase AC voltage, and outputs the three-phase AC voltage to the motor 2, thereby driving the motor 2 that is a three-phase AC motor. The inverter 3 is provided with the smoothing capacitor 33 connected in parallel to the inverter circuit 31 with respect to the high-voltage battery 5, and the pulse voltage generated on the DC side of the inverter 3 is smoothed by the capacitance of the smoothing capacitor 33. At this time, resonance occurs between the smoothing capacitor 33 and the high-voltage battery 5 at a resonance frequency fr expressed by the following Formula (10). In Expression (10), L represents a wiring inductance between the smoothing capacitor 33 and the high-voltage battery 5, and C represents a capacitance of the smoothing capacitor 33.

$$fr=1/\{2\pi \cdot \sqrt{(LC)}\} \tag{10}$$

On the other hand, on the DC side of the inverter 3, a capacitor voltage ripple occurs due to the above-described pulse voltage. The capacitor voltage ripple includes a large number of order components (harmonic components) with respect to fundamental frequency (frequency of fundamental wave component of three-phase AC voltages Vu, Vv, Vw) of the motor 2 determined according to the rotation speed ωr. When the frequency of a specific order component among these order components included in the capacitor voltage ripple matches the resonance frequency fr in Formula (10), the order component is amplified by resonance, leading to an increase in the capacitor voltage ripple. The increase in the capacitor voltage ripple increases a ripple current flowing between the high-voltage battery 5 and the inverter 3, which may accelerate deterioration of the high-voltage battery 5. In addition, the value of the modulation factor H expressed by Formula (5) may suddenly change due to the fluctuation of the power supply voltage Hvdc, and the inverter control by the inverter control device 1 may become unstable.

As a countermeasure against general capacitor voltage ripples, the capacitance of the smoothing capacitor 33 is increased. However, when the capacitance of the smoothing capacitor 33 is increased, the volume of the smoothing capacitor 33 also increases accordingly. Since the smoothing capacitor 33 is a component that occupies a relatively large volume among the components mounted on the inverter 3, there is a large demand for miniaturization. Therefore, it is required to suppress the capacitor voltage ripple by a method other than increasing the capacitance of the smoothing capacitor 33.

Figure 6A:
FIGS. 6A and 6B are diagrams illustrating an example of a capacitor voltage ripple.
Figure 6B:
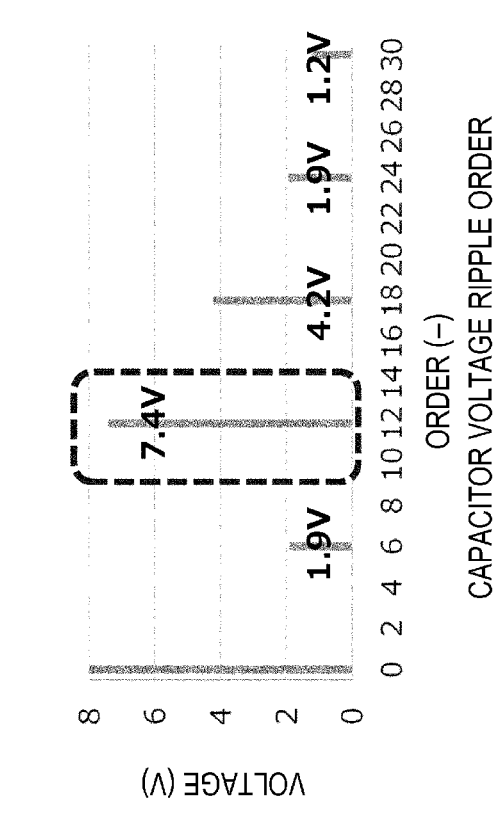

FIG. 6 is a diagram illustrating an example of the capacitor voltage ripple. In FIG. 6, FIGS. 6(*a*) and 6(*b*) each illustrate examples of the capacitor voltage ripple waveform generated in the inverter 3 and frequency analysis result thereof when the number of poles of the motor 2 is 8, the rotation speed is ωr=6000 [rpm], and the voltage of the high-voltage battery 5 is Hvdc=325 [Vdc].

The fundamental frequency of the motor 2 when the motor 2 is driven under the above conditions is obtained as f1=400 [Hz] by the following Formula (11). Therefore, one cycle of the electrical angle in the motor 2 at this time is 1/f1=2.5 [ms]. In Formula (11), P represents the number of poles of the motor 2.

$$f1=(\omega r/60)\cdot (P/2) \tag{11}$$

In the frequency analysis result of the capacitor voltage ripple shown in FIG. 6(*b*), the magnitude of the voltage amplitude in the capacitor voltage ripple of each order component with respect to the fundamental frequency f1 of the motor 2 when the motor 2 is driven under the above-described conditions is shown. From this frequency analysis result, it can be seen that the main order component of the capacitor voltage ripple generated when the motor 2 is driven under the above-described conditions is each order component corresponding to a multiple of 6 with respect to the fundamental frequency f1 of the motor 2, and in particular, the voltage amplitude of the 12th-order component is largely dominant. The reason for this is considered to be that a 12th-order component exists in the vicinity of the resonance frequency fr, and the 12th-order component is amplified by resonance.

Therefore, in the motor drive system 100 of the present embodiment, when a frequency difference between a specific order component (for example, an order component of a multiple of 6) and the resonance frequency fr among the order components of the fundamental wave of the motor 2 whose frequency changes according to the rotation speed ωr of the motor 2 becomes less than a predetermined value, the inverter control device 1 performs the capacitor voltage ripple reduction control. In the capacitor voltage ripple reduction control, the inverter control device 1 causes the voltage phase error calculation unit 165 in the carrier frequency adjustment unit 16 to set the voltage phase error Δθv so as to reduce the voltage amplitude of the order component in the capacitor voltage ripple.

Specifically, the order component selection unit 1652 in the voltage phase error calculation unit 165 selects the order component as the target order component Nr. Then, the fixed carrier phase determination unit 1653 determines the value of the carrier phase difference Δθcarr that reduces the voltage amplitude of the target order component Nr. As a result, the carrier frequency adjustment unit 16 can be operated such that the corrected reference voltage phase θvb2 that reduces the voltage amplitude of the target order component Nr in the capacitor voltage ripple is set, the voltage phase error Δθv corresponding thereto is calculated, and the carrier frequency fc is set.

Figure 7:
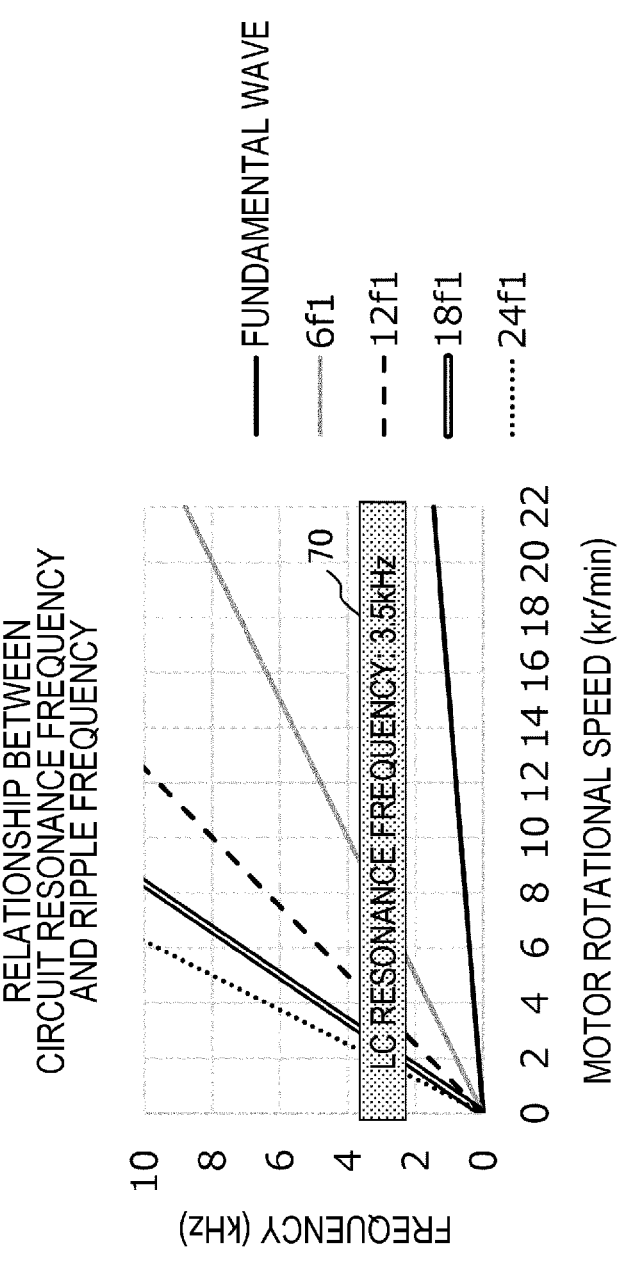
FIG. 7 is a diagram illustrating an example of a relationship between a motor rotation speed and a frequency of each order component.

FIG. 7 is a diagram illustrating an example of a relationship between the motor rotation speed and the frequency of each order component. In FIG. 7, a horizontal axis represents the rotation speed (rotation speed ωr) of the motor 2, and a vertical axis represents the frequency of the fundamental wave component of the motor 2 and each order component of a multiple of 6. As in the case of FIG. 6, the number of poles of the motor 2 is P=8 in FIG. 7.

Here, assuming that the capacitance of the smoothing capacitor 33 is C=1000 [μF] and the wiring inductance between the smoothing capacitor 33 and the high-voltage battery 5 is L=2 [pH], the resonance frequency can be calculated as fr≈3.5 [kHz] from above Formula (10). In FIG. 7, the vicinity of the resonance frequency fr=3.5 [kHz] is indicated by hatching as a resonance frequency band 70.

As can be seen from FIG. 7, in the range where the rotation speed or is 9000 [rpm] or less, there is a region where the frequency of any of the order components of the 6th-order, 12th-order, 18th-order, and 24th-order overlaps the resonance frequency band 70. Note that which order component overlaps the resonance frequency band 70 is determined according to the rotation speed ωr. Therefore, in order to effectively reduce the capacitor voltage ripple over the entire range of the rotation speed ωr that can be taken by the motor 2, it is necessary to select the target order component Nr in consideration of the relationship between the frequency of each order component and the resonance frequency fr as illustrated in FIG. 7.

Specifically, the order component selection unit 1652 calculates the fundamental frequency f1 using Formula (11) based on the rotation speed ωr. Then, the frequency of each order component is calculated based on the fundamental frequency f1, and when the difference between the frequency of any order component and the predetermined resonance frequency fr is less than a predetermined value, the order component is selected as the target order component Nr. Note that, instead of calculating the frequency of each order component, information such as a map indicating the relationship between the rotation speed ωr and the frequency of each order component may be stored in advance so that the target order component Nr can be selected on the basis of the rotation speed ωr. Besides this, the target order component Nr can be selected by an arbitrary method.

Next, the operation of the fixed carrier phase determination unit 1653 will be described. Prior to the present invention, the inventor has found that, when the ratio between the carrier frequency fc and the fundamental frequency f1, that is, the synchronous PWM carrier wave number Nc is 9 or more, shifting the phase of the carrier wave with respect to the modulated wave allows the voltage amplitude of each order component of the capacitor voltage ripple to be changed according to the phase shift amount while maintaining the voltage amplitude of the fundamental wave component of the three-phase AC voltages Vu, Vv, and Vw obtained by pulse width modulation. The fixed carrier phase determination unit 1653 uses such a principle to determine the value of the carrier phase difference Δθcarr on the basis of the modulation factor H and the power factor PF so as to obtain a phase shift amount that minimizes the amplitude of the target order component Nr.

Figures 8A, 8B, 8C, 8D, 8E, 8F:
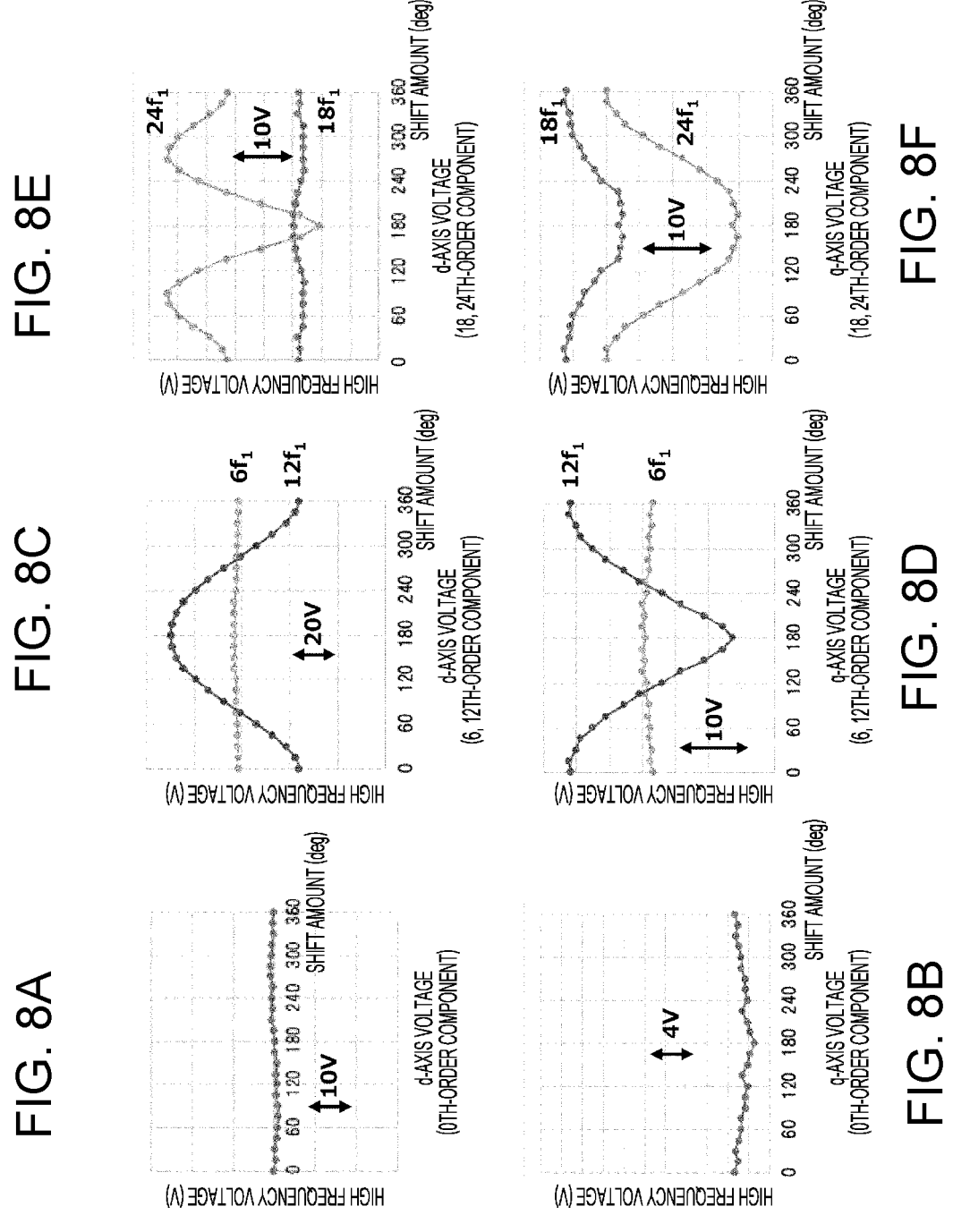
FIGS. 8A to 8F are diagrams illustrating an example of a relationship between a phase shift amount of a carrier wave with respect to a modulated wave and each order component of a d-axis voltage and a q-axis voltage.

FIG. 8 is a diagram illustrating an example of a relationship between the phase shift amount of the carrier wave with respect to the modulated wave and each order component of the d-axis voltage and the q-axis voltage. FIGS. 8(*a*) to 8(*f*) illustrate the relationship between the phase shift amount of the carrier wave with respect to the modulated wave and 0th-order, 6th-order, 12th-order, 18th-order, and 24th-order components of the d-axis voltage and the q-axis voltage, respectively, when the modulation factor is H=1.15 and the synchronous PWM carrier wave numbers Nc is 9.

In the 0th-order components of the d-axis voltage and the q-axis voltage illustrated in FIGS. 8(*a*) and 8(*b*) and in the 6th-order components of the d-axis voltage and the q-axis voltage illustrated in FIGS. 8(*c*) and 8(*d*), respectively, it can be seen that even if the phase shift amount is changed, the fluctuation of the voltage amplitudes can be suppressed within the range of ±2 V or less. On the other hand, in the 12th-order components of the d-axis voltage and the q-axis voltage illustrated in FIGS. 8(*c*) and 8(*d*) and in the 24th-order components of the d-axis voltage and the q-axis voltage illustrated in FIGS. 8(*e*) and 8(*f*), respectively, it can be seen that when the phase shift amount is changed, these voltage amplitudes greatly fluctuate.

Here, the voltage amplitude of each order component of the d-axis and q-axis voltages illustrated in FIG. 8 is obtained by converting the waveform of the PWM pulse signal of each phase obtained by performing pulse width modulation on each of the three-phase voltage commands Vu*, Vv*, and Vw* into the d-axis and q-axis voltages by performing dq conversion on the basis of the rotational position θ. A certain relationship expressed by a known relational expression is established between the DC voltage and the DC current input to the inverter 3 and the dq-axis voltage and the dq-axis current output from the inverter 3, and the DC voltage decreases as the dq-axis voltage decreases. Therefore, if the sum of the specific order components of the dq-axis voltage can be reduced, the order component of the capacitor voltage ripple can also be reduced.

In the present embodiment, focusing on such a characteristic, the fixed carrier phase determination unit 1653 sets the value of the carrier phase difference Δθcarr corresponding to the phase shift amount so as to suppress the voltage amplitude of the target order component Nr of the capacitor voltage ripple.

However, the relationship between the phase shift amount and the amplitude of each order component as illustrated in FIG. 8 changes according to the values of the modulation factor H and the power factor PF. Therefore, the fixed carrier phase determination unit 1653 uses the modulation factor H and the power factor PF as parameters, selects the value of the carrier phase difference Δθcarr optimal for suppressing the voltage amplitude of the target order component Nr according to a combination of these parameter values, and sets the phase shift amount.

Specifically, for example, the fixed carrier phase determination unit 1653 stores in advance a map indicating the optimum value of the carrier phase difference Δθcarr for each combination of the modulation factor H and the power factor PF for each order component that may be selected as the target order component Nr. The fixed carrier phase determination unit 1653 uses the values of the modulation factor H and the power factor PF calculated by the modulation factor calculation unit 163 and the power factor calculation unit 164 as parameters, refers to the map corresponding to the target order component Nr, and acquires the value of the carrier phase difference Δθcarr. As a result, the carrier phase difference Δθcarr can be determined.

FIG. 9 is a diagram illustrating an example of a map of a 12th-order component. In the map example of FIG. 9, for each combination of each value of the modulation factors H=0, 0.1, 0.2, 0.3, 0.4, 0.5, 0.6, 0.7, 0.8, 0.9, 1, 1.1, 1.15 and each value of the power factors PF=1.00, 0.98, 0.94, 0.87, 0.77, the value of the carrier phase difference Δθcarr optimal for suppressing the voltage amplitude of the 12th-order component is described in increments of 15 degrees. In a case where Nr=12, for example, the fixed carrier phase determination unit 1653 can determine the value of the carrier phase difference Δθcarr by referring to a combination value closest to the values of the modulation factor H and the power factor PF at that time in such a map. Note that, although only the example of the map of the 12th-order component is illustrated in FIG. 9, a similar map is stored in the fixed carrier phase determination unit 1653 for other order components.

Alternatively, the carrier phase difference Δθcarr may be determined by a method other than the map. For example, the relationship between the modulation factor H and the power factor PF and the carrier phase difference Δθcarr may be expressed by an arithmetic expression for each value of the target order component Nr, and the carrier phase difference Δθcarr may be determined using this arithmetic expression. In addition to this, if an appropriate value of the carrier phase difference Δθcarr can be determined on the basis of the target order component Nr, the modulation factor H, and the power factor PF, the fixed carrier phase determination unit 1653 can determine the carrier phase difference Δθcarr using an arbitrary method.

FIG. 10 is a diagram illustrating a comparative example of the capacitor voltage ripple in the conventional technique and the present invention. FIG. 10 illustrates an example in which the magnitudes of the voltage amplitudes of the capacitor voltage ripples when the modulation factor and the power factor are changed are obtained by simulation in a case where the conventional inverter to which the present invention is not applied is used and in a case where the specific order component of the capacitor voltage ripples is reduced by shifting the phase of the carrier wave with respect to the modulated wave using the inverter 3 of the present invention. FIG. 10(a) illustrates simulation results in the case of the power factor PF=1.00, FIG. 10(b) illustrates the simulation results in the case of the power factor PF=0.98, FIG. 10(c) illustrates the simulation results in the case of the power factor PF=0.94, FIG. 10(d) illustrates the simulation results in the case of the power factor PF=0.87, and FIG. 10(e) illustrates the simulation results in the case of the power factor PF=0.77. A horizontal axis represents the modulation factor H, and a vertical axis represents the voltage amplitude of the capacitor voltage ripple.

From the respective simulation results of FIG. 10, it can be seen that, in any case, the capacitor voltage ripple can be suppressed by shifting the phase of the carrier wave with respect to the modulated wave by the application of the present invention thereby reducing the specific order component of the capacitor voltage ripple.

FIG. 11 is a diagram illustrating a comparative example of the capacitor voltage ripple before and after the phase of the carrier wave is shifted in the inverter 3. FIG. 11(a) illustrates exemplary waveforms of the U-phase voltage command Vu* and the carrier wave signal Tr before the phase shift of the carrier wave, FIG. 11(b) illustrates exemplary waveforms of the capacitor voltage ripples before the phase shift of the carrier wave, and FIG. 11(c) illustrates frequency analysis results of FIG. 11(b). FIGS. 11(b) and 11(c) are the same as FIGS. 6(a) and 6(b) described above, respectively. On the other hand, FIG. 11(d) illustrates exemplary waveforms of the U-phase voltage command Vu* and the carrier wave signal Tr after the phase shift of the carrier wave, FIG. 11(e) illustrates exemplary waveforms of the capacitor voltage ripples after the phase shift of the carrier wave, and FIG. 11(f) illustrates frequency analysis results of FIG. 11(e). FIGS. 11(d), 11(e), and 11(f) illustrate an example in which the value of the carrier phase difference Δθcarr is set to 245 [deg] in the fixed carrier phase determination unit 1653.

As described above, when the 12th-order component of the fundamental wave of the motor 2 is in the vicinity of the resonance frequency fr, the order component selection unit 1652 in the inverter control device 1 selects the 12th-order component as the target order component Nr based on the rotation speed or. Then, the fixed carrier phase determination unit 1653 determines the carrier phase difference Δθcarr that reduces the 12th-order component that is the target order component Nr based on the modulation factor H and the power factor PF. By generating the carrier wave signal Tr according to the carrier phase difference Δθcarr, the phase of the carrier wave with respect to the modulated wave is shifted as illustrated in FIGS. 11(a) and 11(d).

The PWM pulse signal is generated by performing pulse width modulation based on the three-phase voltage commands Vu*, Vv*, and Vw* using the carrier wave after the phase shift as described above. In this way, as illustrated in FIGS. 11(c) and 11(f), the voltage of the 12th-order component increased by resonance in the capacitor voltage ripple can be reduced from 7.4 [V] to 0.7 [V]. As a result, as illustrated in FIGS. 11(b) and 11(e), the voltage amplitude (peak-to-peak) of the capacitor voltage ripple can be suppressed from 28.5 [V] to 13.3 [V].

In the capacitor voltage ripple suppression method described in the present embodiment, since the magnitude of the suppressible voltage amplitude is strongly affected by the modulation factor H and the power factor PF, there is a concern that the target cannot be sufficiently achieved if the capacitor voltage ripple is to be reduced in all the rotation speed range of the motor 2. Therefore, it is desirable to achieve the target by using the capacitor voltage ripple suppression method of the present embodiment in combination with the increase in the capacitance of the smoothing capacitor 33.

In addition, when the rotation speed ωr of the motor 2 and the torque command T* change rapidly, if the capacitor voltage ripple suppression method of the present embodiment is implemented, there is a concern that the phase shift amount of the carrier wave cannot sufficiently follow the command value. Therefore, for example, when the rotation speed ωr changes at a predetermined acceleration or more, that is, when a change rate of the rotation speed ωr is a predetermined value or more, the phase shift amount of the carrier wave may not be changed by making the carrier phase difference Δθcarr constant without being changed. Then, when the change rate of the rotation speed or becomes less than the predetermined value, the carrier phase difference Δθcarr is determined based on the values of the modulation factor H and the power factor PF at that time, and is changed to a target phase shift amount, thereby suppressing the capacitor voltage ripple. When the rotation speed ωr does not change, the carrier phase difference Δθcarr is constant, and thus, also in this case, the phase shift amount of the carrier wave is constant without being changed.

When the value of the carrier phase difference Δθcarr selected by the fixed carrier phase determination unit 1653 changes according to a change in the rotational state of the motor 2, for example, a change in at least one of the modulation factor H, the power factor PF, and the rotation speed ωr, the value of the voltage phase error Δθv output from the voltage phase error calculation unit 165 before and after the change may be continuously changed instead of being switched stepwise. For example, by inputting the voltage phase error Δθv output from the voltage phase error calculation unit 165 to the synchronous carrier frequency calculation unit 166 via the temporary delay filter, the voltage phase error Δθv can be continuously changed. In this way, when the phase shift amount of the carrier wave is changed for the purpose of suppressing the capacitor voltage ripple, it is possible to prevent the torque and the rotation speed of the motor 2 from changing suddenly.

The voltage phase error calculation unit 165 calculates the voltage phase error Δθv as described above. As a result, it is possible to determine the phase shift amount for reducing the voltage amplitude of a specific order component among the order components of the capacitor voltage ripple superimposed on the power supply voltage Hvdc supplied from the high-voltage battery 5 based on the rotation speed ωr, the modulation factor H, and the power factor PF, and determine the voltage phase error Δθv so as to change the phase difference between the three-phase voltage commands Vu*, Vv*, and Vw* and the carrier wave signal Tr according to the determined phase shift amount. As a result, the carrier frequency fc can be set by changing the phase difference between the voltage command to the inverter 3 and the carrier wave used for the pulse width modulation so as to suppress the capacitor voltage ripple.

In carrier frequency adjustment unit 16, the above processing may be performed either during the power driving or the regenerative driving of motor 2. The torque command T* becomes a positive value during the power driving, and the torque command T* becomes a negative value during the regenerative driving. Therefore, the carrier frequency adjustment unit 16 determines whether the motor 2 is in the power driving or the regenerative driving from the value of the torque command T*, and the voltage phase error calculation unit 165 performs the above-described calculation processing on the basis of the determination result, so that the carrier frequency fc can be set by changing the voltage phase error Δθv so as to suppress the capacitor voltage ripple.

According to the first embodiment of the present invention described above, the following operational effects are achieved.

(1) An inverter control device 1 controls an inverter 3 that converts a DC voltage Hvdc into an AC voltage and outputs the AC voltage to a motor 2, and includes a carrier wave generation unit 17 that generates a carrier wave signal Tr, a carrier frequency adjustment unit 16 that adjusts a carrier frequency fc representing a frequency of the carrier wave signal Tr, and a PWM control unit 18 that performs pulse width modulation on three-phase voltage commands Vu*, Vv*, and Vw* using the carrier wave signal Tr and generates a PWM pulse signal for controlling the operation of the inverter 3. The carrier frequency adjustment unit 16 determines a carrier phase difference Δθcarr representing a phase shift amount for reducing a voltage amplitude of a specific order component among order components of a capacitor voltage ripple superimposed on the DC voltage Hvdc, and adjusts the carrier frequency fc so as to change a voltage phase error Δθv representing a phase difference between the three-phase voltage commands Vu*, Vv*, and Vw* and the carrier wave signal Tr according to the determined carrier phase difference Δθcarr. In this way, the capacitor voltage ripple can be sufficiently suppressed.

(2) The carrier frequency adjustment unit 16 determines the carrier phase difference Δθcarr on the basis of a modulation factor H, which is a ratio between the DC voltage Hvdc and the AC voltage, and a power factor PF, which represents a phase difference between the AC voltage and the AC current output from the inverter 3 to the motor 2. With this configuration, the carrier phase difference Δθcarr that can sufficiently suppress the capacitor voltage ripple that is strongly affected by the modulation factor H and the power factor PF can be determined.

(3) The carrier frequency adjustment unit 16 selects a specific order component (target order component Nr) whose voltage amplitude is to be reduced in the capacitor voltage ripple on the basis of a rotation speed ωr representing a rotation speed of the motor 2. Specifically, the carrier frequency adjustment unit 16 selects, as the target order component Nr, an order component in which a frequency difference from the resonance frequency fr of the inverter 3 on the input path of the DC voltage Hvdc is less than a predetermined value among the order components of the voltage ripples whose frequency changes according to the rotation speed ωr. In this way, since the order component amplified by resonance can be selected as the target order component Nr, the capacitor voltage ripple can be effectively suppressed.

(4) For example, the carrier frequency adjustment unit 16 selects an order component of a multiple of 6 as the target order component Nr. In this way, the order component of a multiple of 6, which is the main order component of the capacitor voltage ripple, is selected as the target order component Nr, and the voltage amplitude of the target order component Nr can be reduced, so that the capacitor voltage ripple can be reliably suppressed.

(5) The carrier frequency adjustment unit 16 adjusts the carrier frequency fc so that the carrier frequency fc becomes an integral multiple of the frequencies of the three-phase voltage commands Vu*, Vv*, and Vw* by selecting the synchronous PWM carrier wave number Nc to a predetermined integer value by the synchronous PWM carrier wave number selection unit 161. Specifically, for example, by selecting the synchronous PWM carrier wave number Nc to be a multiple of 3, the carrier frequency fc is adjusted such that the number of carrier waves per cycle of the three-phase voltage commands Vu*, Vv*, and Vw* is a multiple of 3. With this configuration, it is possible to adjust the voltage waveforms of the three-phase voltage commands Vu*, Vv*, and Vw* so that the cycle and the phase of the carrier wave signal Tr have a desired relationship, and to reliably perform the synchronous PWM control.

(6) When the rotation speed ωr does not change or when a change rate of the rotation speed ωr is a predetermined value or more, the carrier frequency adjustment unit 16 may make the carrier phase difference Δθcarr constant without changing. In this way, the capacitor voltage ripple can be suppressed while maintaining the control followability.

Second Embodiment

Next, a second embodiment of the present invention will be described with reference to the drawings.

Figure 12:
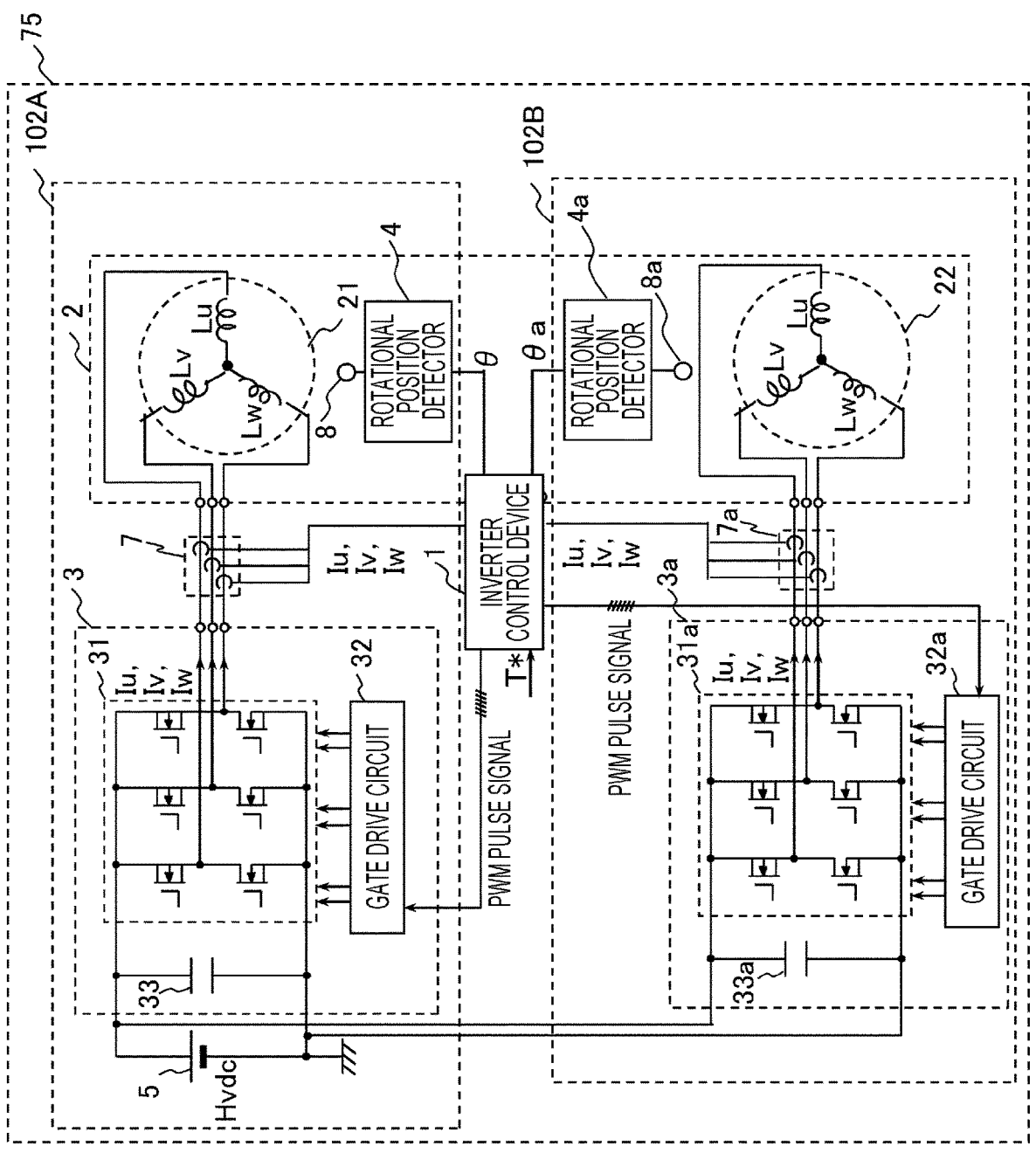
FIG. 12 is an overall configuration diagram of a motor drive system according to a second embodiment of the present invention.

FIG. 12 is an overall configuration diagram of a motor drive system according to the second embodiment of the present invention. In FIG. 12, the motor drive system 75 includes redundant drive systems 102A and 102B, and the inverter control device 1, the motor 2, and the high-voltage battery 5 are commonly connected to these drive systems 102A and 102B. In the present embodiment, the motor 2 includes two winding systems 21 and 22, one winding system 21 constitutes the drive system 102A, and the other winding system 22 constitutes the drive system 102B.

The drive system 102A includes an inverter 3 and a rotational position detector 4, and a rotational position sensor 8 for detecting a rotational position θ of a rotor corresponding to the winding system 21 is attached to the motor 2. The AC power generated by the inverter 3 flows to the winding system 21 of the motor 2 to rotationally drive the motor 2. In the drive system 102A, the current detection unit 7 is disposed between the inverter 3 and the motor 2.

The drive system 102B includes an inverter 3a and a rotational position detector 4a, and a rotational position sensor 8a for detecting a rotational position θa of a rotor corresponding to the winding system 22 is attached to the motor 2. The AC power generated by the inverter 3a flows to the winding system 22 of the motor 2 to rotationally drive the motor 2. In the drive system 102B, a current detection unit 7a is disposed between the inverter 3a and the motor 2.

The inverter control device 1 of the present embodiment is connected to the inverters 3 and 3a. A torque command T* for the motor 2 is input to the inverter control device 1. The inverter control device 1 generates a PWM pulse signal for controlling the driving of the motor 2 by the method described in the first embodiment on the basis of the input torque command T*, and outputs the PWM pulse signal to each of the inverters 3 and 3a. That is, the voltage phase error calculation unit 165 of the carrier frequency adjustment unit 16 included in the inverter control device 1 sets the carrier phase difference Δθcarr so that the capacitor voltage ripples generated in the drive systems 102A and 102B can be suppressed, and the frequency of the carrier wave signal Tr is adjusted by calculating the voltage phase error Δθv on the basis of the carrier phase difference Δθcarr. At this time, the fixed carrier phase determination unit 1653 preferably refers to separate maps for the drive system 102A and the drive system 102B, and sets the values of the carrier phase differences Δθcarr for the drive systems 102A and 102B so that the capacitor voltage ripples generated in the drive systems 102A and 102B can be most effectively reduced.

Alternatively, the value of the carrier phase difference ΔθCarr with respect to the drive systems 102A and 102B may be set so that the sum of the capacitor voltage ripples of the drive systems 102A and 102B can be most effectively reduced.

According to the present embodiment, the motor drive system 75 of FIG. 12 is realized using the inverter control device 1 described in the first embodiment, so that an effect of suppressing capacitor voltage ripples can be obtained for each of the drive system 102A and the drive system 102B.

Third Embodiment

Next, a third embodiment of the present invention will be described with reference to the drawings.

Figure 13:
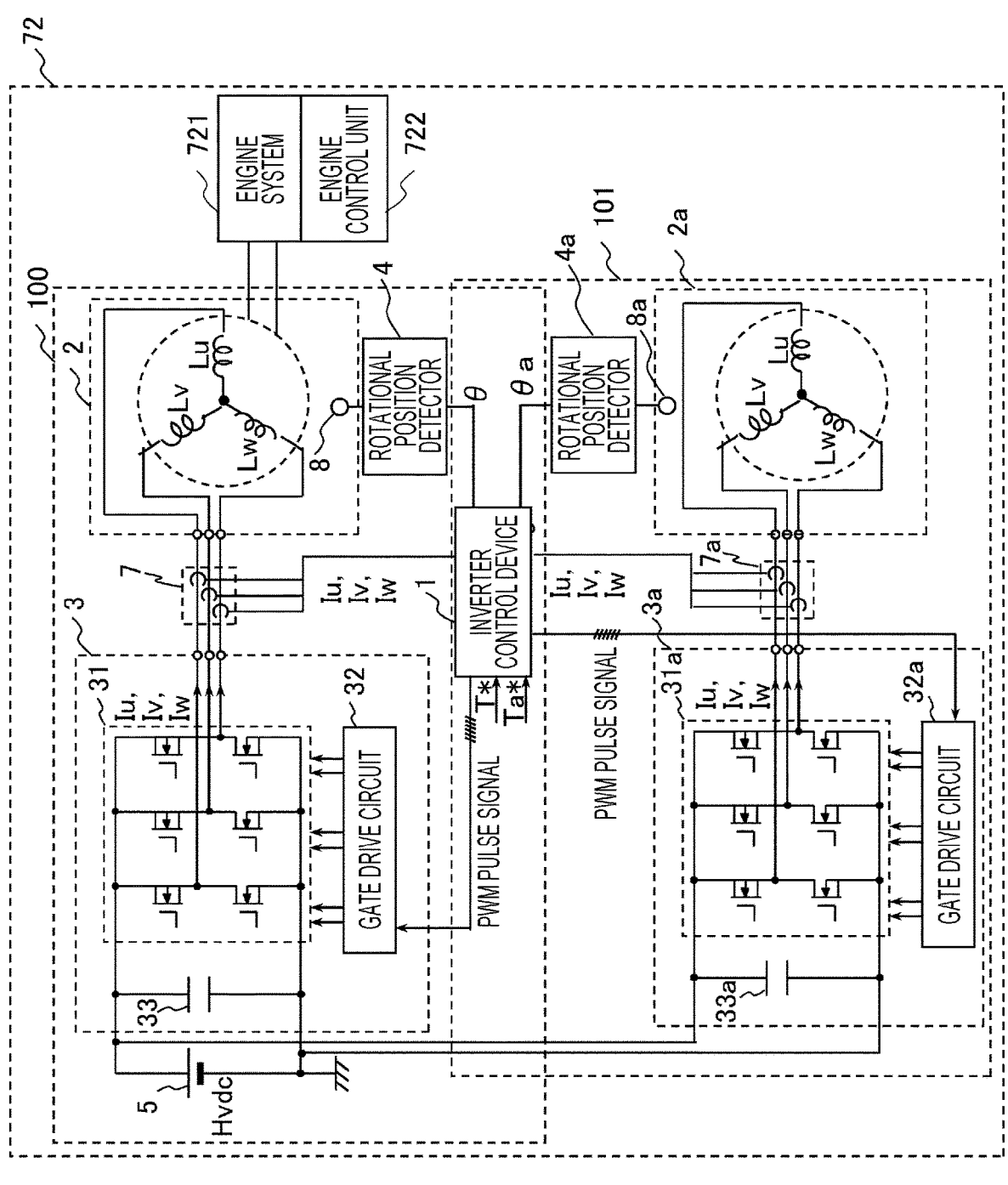
FIG. 13 is a configuration diagram of a hybrid system according to a third embodiment of the present invention.

FIG. 13 is a configuration diagram of a hybrid system 72 according to the third embodiment of the present invention.

As illustrated in FIG. 13, the hybrid system 72 includes the motor drive system 100 (inverter control device 1, motor 2, inverter 3, rotational position detector 4, high-voltage battery 5, current detection unit 7) described in the first embodiment and a motor drive system 101 (inverter control device 1, motor 2a, inverter 3a, rotational position detector 4a, high-voltage battery 5, current detection unit 7a) similar thereto. The motor drive systems 100 and 101 share the high-voltage battery 5 with the inverter control device 1.

A rotational position sensor 8a for detecting the rotational position θa of the rotor is attached to the motor 2a. The rotational position detector 4a calculates a rotational position θa from an input signal of the rotational position sensor 8a, and outputs the rotational position θa to the inverter control device 1. A current detection unit 7a is disposed between the inverter 3a and the motor 2a. The torque generated in the rotor of the motor 2a is transmitted from a rotating shaft fixed to the rotor to the outside of the motor drive system 101.

The inverter 3a includes an inverter circuit 31a, a gate drive circuit 32a, and a smoothing capacitor 33a. The gate drive circuit 32a is connected to the inverter control device 1 common to the gate drive circuit 32 of the inverter 3, generates a gate drive signal for controlling each switching element included in the inverter circuit 31a based on the PWM pulse signal input from the inverter control device 1, and outputs the gate drive signal to the inverter circuit 31a. The inverter circuit 31a and the smoothing capacitor 33a are connected to the high-voltage battery 5 common to the inverter circuit 31 and the smoothing capacitor 33.

A torque command T* for the motor 2 and a torque command Ta* for the motor 2a are input to the inverter control device 1. Based on these torque commands, the inverter control device 1 generates PWM pulse signals for controlling the driving of the motors 2 and 2a by the method described in the first embodiment, and outputs the PWM pulse signals to the inverters 3 and 3a, respectively. That is, the voltage phase error calculation unit 165 of the carrier frequency adjustment unit 16 included in the inverter control device 1 calculates the voltage phase error Δθv to adjust the frequency of the carrier wave signal Tr so that each capacitor voltage ripple generated in the motor drive systems 100 and 101 can be suppressed. Note that, in the voltage phase error calculation unit 165, the fixed carrier phase determination unit 1653 may set the carrier phase difference ΔθCarr with different values for each of the inverters 3 and 3a.

An engine system 721 and an engine control unit 722 are connected to the motor 2. The engine system 721 is driven under the control of the engine control unit 722 to rotationally drive the motor 2. The motor 2 is rotationally driven by the engine system 721 to operate as a generator and generate AC power. The AC power generated by the motor 2 is converted into DC power by the inverter 3 and charged in the high-voltage battery 5. As a result, the hybrid system 72 can function as a series hybrid system. The engine system 721 and the engine control unit 722 may be connectable to the motor 2a.

According to the present embodiment, the hybrid system 72 of FIG. 13 is realized using the inverter control device 1 described in the first embodiment, so that the effect of suppressing the capacitor voltage ripple can be obtained for each of the motor drive system 100 and the motor drive system 101 as in the second embodiment.

Fourth Embodiment

Next, a fourth embodiment of the present invention will be described with reference to the drawings.

Figure 14:
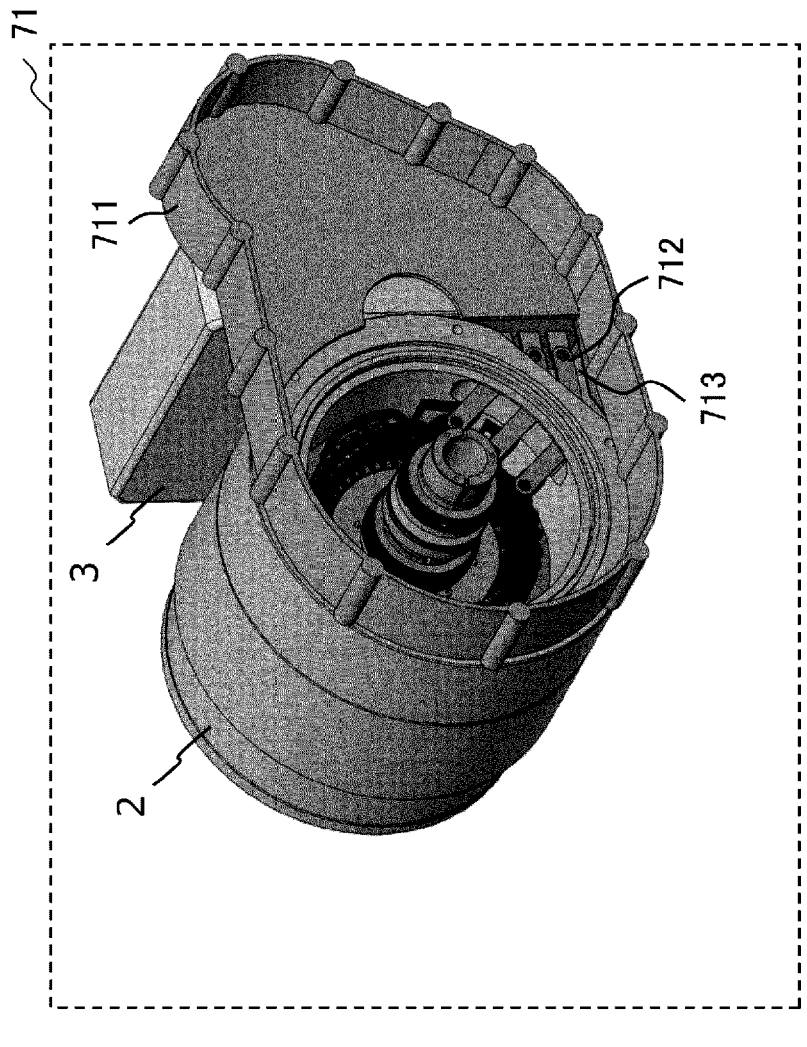
FIG. 14 is an external perspective view of an electromechanical integrated unit according to a fourth embodiment of the present invention.

FIG. 14 is an external perspective view of an electromechanical integrated unit 71 according to the fourth embodiment of the present invention. The electromechanical integrated unit 71 includes the motor drive system 100 (inverter control device 1, motor 2, and inverter 3) described in the first embodiment. The motor 2 and the inverter 3 are connected by a coupling portion 713 via a bus bar 712. The output of the motor 2 is transmitted to a differential gear (not illustrated) via a gear 711 and is transmitted to an axle. Although the inverter control device 1 is not illustrated in FIG. 14, the inverter control device 1 can be arranged at an arbitrary position.

The electromechanical integrated unit 71 is characterized by a structure in which the motor 2, the inverter 3, and the gear 711 are integrated. In the electromechanical integrated unit 71, since downsizing by such an integrated structure is strongly required, it is necessary to reduce the size of the smoothing capacitor 33 occupying a large space inside the inverter 3. Therefore, by using the inverter control device 1 described in the first embodiment, capacitor voltage ripple can be suppressed while the capacitance of the smoothing capacitor 33 is reduced and downsizing is achieved. Therefore, a small electromechanical integrated unit can be realized.

Fifth Embodiment

Next, an embodiment in which the motor drive system 100 described in the first embodiment is applied to a vehicle will be described with reference to FIG. 15.

Figure 15:
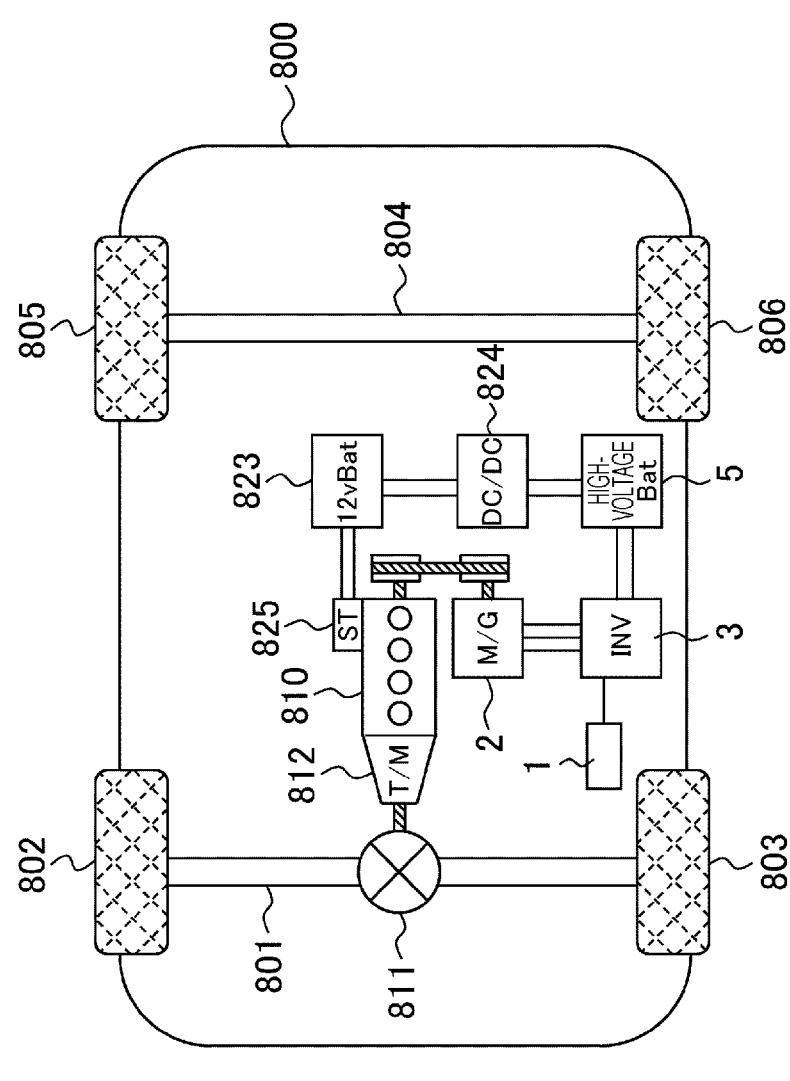
FIG. 15 is a configuration diagram of a hybrid automobile system according to a fifth embodiment of the present invention.

FIG. 15 is a configuration diagram of a hybrid automobile system according to a fifth embodiment of the present invention. As illustrated in FIG. 15, the hybrid automobile system of the present embodiment has a power train to which the motor 2 is applied as a motor/generator.

In the hybrid automobile system illustrated in FIG. 15, a front wheel axle 801 is rotatably supported on a front portion of a vehicle body 800, and front wheels 802 and 803 are provided at both ends of the front wheel axle 801. A rear wheel axle 804 is rotatably supported on a rear portion of the vehicle body 800, and rear wheels 805 and 806 are provided at both ends of the rear wheel axle 804.

A differential gear 811 which is a power distribution mechanism is provided in a central portion of the front wheel axle 801, and the rotational driving force transmitted from the engine 810 via the transmission 812 is distributed to the left and right front wheel axles 801.

A pulley provided on a crankshaft of the engine 810 and a pulley provided on a rotation shaft of the motor 2 are mechanically connected via a belt.

As a result, the rotational driving force of the motor 2 can be transmitted to the engine 810, and the rotational driving force of the engine 810 can be transmitted to the motor 2. In the motor 2, the three-phase AC power output from the inverter 3 according to the control of the inverter control device 1 is supplied to the stator coil of the stator, whereby the rotor rotates, and a rotational driving force according to the three-phase AC power is generated.

That is, while the motor 2 operates as an electric motor using the three-phase AC power output from the inverter 3 by the control of the inverter control device 1, an electromotive force is induced in the stator coil of the stator by the rotation of the rotor by receiving the rotational driving force of the engine 810, and the motor 2 operates as a generator that generates the three-phase AC power.

The inverter 3 is a power conversion device that converts DC power supplied from the high-voltage battery 5, which is a high-voltage (42 V or 300 V) system power supply, into three-phase AC power, and controls a three-phase AC current flowing through the stator coil of the motor 2 according to the operation command value and the magnetic pole position of the rotor.

The three-phase AC power generated by the motor 2 is converted into DC power by the inverter 3 to charge the high-voltage battery 5. The high-voltage battery 5 is electrically connected to a low-voltage battery 823 via a DC-DC converter 824. The low-voltage battery 823 constitutes a low voltage (14 V) power supply of an automobile, and is used as a power supply for a starter 825 for initially starting (cold starting) the engine 810, a radio, lights, and the like.

When the vehicle is at a stop (idle stop mode) such as waiting for a traffic light, the engine 810 is stopped, and when the engine 810 is restarted (hot start) at the time of re-departure, the motor 2 is driven by the inverter 3 to restart the engine 810. In the idle stop mode, when the charge amount of the high-voltage battery 5 is insufficient or when the engine 810 is not sufficiently warmed, the engine 810 is not stopped and continues to be driven. Further, during the idle stop mode, it is necessary to secure a drive source of auxiliary machines using the engine 810 as a drive source, such as a compressor of an air conditioner. In this case, the motor 2 is driven to drive the auxiliary machines.

Even in the acceleration mode or the high load operation mode, the motor 2 is driven to assist the driving of the engine 810. On the other hand, in the charging mode in which the high-voltage battery 5 needs to be charged, the engine 810 causes the motor 2 to generate power to charge the high-voltage battery 5. That is, a regeneration mode such as braking or deceleration of the vehicle is performed.

In the hybrid vehicle system of FIG. 15 realized using the motor drive system 100 described in the first embodiment, the phase shift amount for reducing the voltage amplitude of the specific order component among the order components of the capacitor voltage ripple is determined based on the rotation speed ωr, the modulation factor H, and the power factor PF, and the voltage phase error Δθv is determined so as to change the phase difference between the three-phase voltage commands Vu*, Vv*, and Vw* and the carrier wave signal Tr according to the determined phase shift amount. As a result, capacitor voltage ripple can be suppressed, so that deterioration of a battery used in an environmentally friendly vehicle such as an electric vehicle or a hybrid vehicle can be prevented, and motor control can be stabilized.

In each of the embodiments described above, each configuration (FIGS. 2, 3, 4, and the like) in the inverter control device 1 may implement the function of each configuration by a CPU and a program regardless of the configuration by hardware. In a case where each configuration in the inverter control device 1 is realized by a CPU and a program, there is an advantage that the cost can be reduced because the number of pieces of hardware is reduced. In addition, this program can be provided by being stored in advance in a storage medium of the inverter control device. Alternatively, the program may be stored and provided in an independent storage medium, or the program may be recorded and stored in a storage medium of the inverter control device via a network line. Various forms of computer-readable computer program products, such as data signals (carrier waves), may be provided.

Note that the present invention is not limited to the above-described embodiments, and various modifications can be made without departing from the gist of the present invention.

REFERENCE SIGNS LIST

1 inverter control device
2 motor
3 inverter
4 rotational position detector
5 high-voltage battery
7 current detection unit
8 rotational position sensor
11 current command generation unit
12 speed calculation unit
13 three-phase/dq conversion current control unit
14 current control unit
15 dq/three-phase voltage command conversion unit
16 carrier frequency adjustment unit
17 carrier wave generation unit
18 PWM control unit
31 inverter circuit
32 gate drive circuit
33 smoothing capacitor
71 electromechanical integrated unit
72 hybrid system
75, 100, 101 motor drive system
102A, 102B drive system
161 synchronous PWM carrier wave number selection unit
162 voltage phase calculation unit
163 modulation factor calculation unit
164 power factor calculation unit
165 voltage phase error calculation unit
166 synchronous carrier frequency calculation unit
167 carrier frequency setting unit
1651 reference voltage phase calculation unit
1652 order component selection unit
1653 fixed carrier phase determination unit
1654 addition unit
1655 subtraction unit
711 gear
712 bus bar
713 coupling portion
800 vehicle body
801 front wheel axle
802 front wheel
803 front wheel
804 rear wheel axle
805 rear wheel

806 rear wheel
810 engine
811 differential gear
812 transmission
823 low-voltage battery
824 DC-DC converter
825 starter
The invention claimed is:

1. An inverter control device that controls an inverter that converts a DC voltage into an AC voltage and outputs the AC voltage to a motor, the inverter control device comprising:

a carrier wave generation unit that generates a carrier wave;

a carrier frequency adjustment unit that adjusts a frequency of the carrier wave; and a PWM control unit that performs pulse width modulation on a voltage command using the carrier wave and generates a PWM pulse signal for controlling an operation of the inverter, wherein the carrier frequency adjustment unit determines a phase shift amount for reducing a voltage amplitude of a specific order component among order components of a voltage ripple superimposed on the DC voltage, and adjusts the frequency of the carrier wave to change a phase difference between the voltage command and the carrier wave according to the determined phase shift amount, wherein the carrier frequency adjustment unit determines the phase shift amount based on a modulation factor that is a ratio between the DC voltage and the AC voltage, and a power factor that represents a phase difference between the AC voltage and an AC current output from the inverter to the motor, and wherein the carrier frequency adjustment unit selects the specific order component based on a rotation speed of the motor.

2. The inverter control device according to claim 1, wherein the carrier frequency adjustment unit selects, as the specific order component, an order component in which a frequency difference from a resonance frequency of the inverter in an input path of the DC voltage is less than a predetermined value from among order components of the voltage ripple whose frequency changes according to the rotation speed of the motor.

3. The inverter control device according to claim 1, wherein the carrier frequency adjustment unit selects an order component of a multiple of 6 as the specific order component.

4. The inverter control device according to claim 1, wherein the carrier frequency adjustment unit adjusts the frequency of the carrier wave so that the frequency of the carrier wave is an integral multiple of a frequency of the voltage command.

5. The inverter control device according to claim 4, wherein the carrier frequency adjustment unit adjusts the frequency of the carrier wave such that the number of carrier waves per cycle of the voltage command is a multiple of three.

6. The inverter control device according to claim 1, wherein the carrier frequency adjustment unit keeps the phase shift amount constant without changing the phase shift amount when the rotation speed of the motor does not change.

7. The inverter control device according to claim 1, wherein the carrier frequency adjustment unit keeps the phase shift amount constant without changing the phase shift amount when a change rate of the rotation speed of the motor is equal to or greater than a predetermined value.

8. The inverter control device according to claim 1, wherein the carrier frequency adjustment unit continuously changes the phase difference according to a change in a rotation state of the motor.

9. The inverter control device according to claim 1, wherein the inverter control device is connected to a plurality of inverters and outputs the PWM pulse signal to each of the plurality of inverters.

10. A hybrid system comprising:
the inverter control device according to claim 1;
the inverter connected to the inverter control device;
the motor driven by the inverter; and
an engine system connected to the motor.

11. An electromechanical integrated unit comprising:
the inverter control device according to claim 1;
the inverter connected to the inverter control device;
the motor driven by the inverter; and
a gear that transmits a rotational driving force of the motor,
wherein the motor, the inverter, and the gear are integrated.

12. An electric vehicle system comprising:
the inverter control device according to claim 1;
the inverter connected to the inverter control device; and
the motor driven by the inverter,
wherein the electric vehicle system travels using a rotational driving force of the motor.

13. An inverter control method for controlling an inverter that converts a DC voltage into an AC voltage and outputs the AC voltage to a motor, the method comprising:

generating a carrier wave;

determining a phase shift amount for reducing a voltage amplitude of a specific order component among order components of a voltage ripple superimposed on the DC voltage;

adjusting a frequency of the carrier wave to change a phase difference between a voltage command and the carrier wave according to the determined phase shift amount;

generating a PWM pulse signal for controlling an operation of the inverter by performing pulse width modulation on the voltage command using the carrier wave; and determining the phase shift amount based on a modulation factor that is a ratio between the DC voltage and the AC voltage, and a power factor that represents a phase difference between the AC voltage and an AC current output from the inverter to the motor, and wherein said adjusting is performed based on a rotation speed of the motor.

14. An inverter control device that controls an inverter that converts a DC voltage into an AC voltage and outputs the AC voltage to a motor, the inverter control device comprising:

a carrier wave generation unit that generates a carrier wave;

a carrier frequency adjustment unit that adjusts a frequency of the carrier wave; and a PWM control unit that performs pulse width modulation on a voltage command using the carrier wave and generates a PWM pulse signal for controlling an operation of the inverter, wherein the carrier frequency adjustment unit determines a phase shift amount for reducing a voltage amplitude of a specific order component among order components of a voltage ripple superimposed on the DC voltage, and adjusts the frequency of the carrier wave to change a phase difference between the voltage command and the carrier wave according to the determined phase shift amount, wherein the carrier frequency adjustment unit selects the specific order component based on a rotation speed of the motor, and wherein the carrier frequency adjustment unit selects, as the specific order component, an order component in which a frequency difference from a resonance frequency of the inverter in an input path of the DC voltage is less than a predetermined value from among order components of the voltage ripple whose frequency changes according to the rotation speed of the motor.

15. An inverter control method for controlling an inverter that converts a DC voltage into an AC voltage and outputs the AC voltage to a motor, the method comprising:

generating a carrier wave;

determining a phase shift amount for reducing a voltage amplitude of a specific order component among order components of a voltage ripple superimposed on the DC voltage;

adjusting a frequency of the carrier wave to change a phase difference between a voltage command and the carrier wave according to the determined phase shift amount;

generating a PWM pulse signal for controlling an operation of the inverter by performing pulse width modulation on the voltage command using the carrier wave; and selecting, as the specific order component, an order component in which a frequency difference from a resonance frequency of the inverter in an input path of the DC voltage is less than a predetermined value from among order components of the voltage ripple whose frequency changes according to a rotation speed of the motor, wherein said adjusting is performed based on the rotation speed of the motor.

* * * * *